United States Patent
Touze et al.

(10) Patent No.: US 12,335,495 B2
(45) Date of Patent: Jun. 17, 2025

(54) CHROMA BOOST ON SDR AND HDR DISPLAY ADAPTED SIGNALS FOR SL-HDRx SYSTEMS

(71) Applicant: InterDigital CE Patent Holdings, SAS, Paris (FR)

(72) Inventors: David Touze, Rennes (FR); Marie-Jean Colaitis, Cesson-Sévigné (FR); Catherine Serre, Saint Gregoire (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 17/922,688

(22) PCT Filed: Apr. 28, 2021

(86) PCT No.: PCT/EP2021/061060
§ 371 (c)(1),
(2) Date: Nov. 1, 2022

(87) PCT Pub. No.: WO2021/224076
PCT Pub. Date: Nov. 11, 2021

(65) Prior Publication Data
US 2024/0187616 A1 Jun. 6, 2024

(30) Foreign Application Priority Data
May 5, 2020 (EP) .................................. 20305440

(51) Int. Cl.
*H04N 19/186* (2014.01)
*H04N 19/117* (2014.01)
(Continued)

(52) U.S. Cl.
CPC ......... *H04N 19/186* (2014.11); *H04N 19/117* (2014.11); *H04N 19/142* (2014.11); *H04N 19/182* (2014.11)

(58) Field of Classification Search
CPC .. H04N 19/186; H04N 19/117; H04N 19/142; H04N 19/182
(Continued)

(56) References Cited

U.S. PATENT DOCUMENTS 11,257,195 B2 2/2022 Andrivon et al.
2004/0120576 A1 6/2004 Kim
(Continued)

FOREIGN PATENT DOCUMENTS

CN 102223547 A 10/2011
JP 2018-191269 A 11/2018
(Continued)

OTHER PUBLICATIONS

High-Performance Single Layer High Dynamic Range (HDR) System for use In Consumer Electronics devices; Part 1: Directly Standard Dynamic Range (SDR) Compatible HDR System (SL-HDR1), EBU Operating Eurovision, European Broadcasting Union, ETSI TS 103 433-1 V1.2.1, Aug. 2017 (Year: 2017).*
(Continued)

*Primary Examiner* — Behrooz M Senfi
(74) *Attorney, Agent, or Firm* — Condo Roccia Koptiw LLP

(57) ABSTRACT

A method comprising obtaining a current RGB image; classifying colors of pixels of the current RGB image in a plurality of classes; for each color class, determining data representative of said color class, comprising a dominant luminance value representative of a luminance at which a color in said class is predominant and determining from said data representative of said color class a value representative
(Continued)

of a gain of chrominance representative of a margin for increasing a chrominance component in said color class; and, encoding the dominant luminance value and the value representative of the gain corresponding to each class as metadata representative of a Saturation Gain Function in a bitstream, said function defining a color correction to apply to a pixel in function of a luminance of said pixel.

19 Claims, 11 Drawing Sheets

(51) Int. Cl.
  *H04N 19/142* (2014.01)
  *H04N 19/182* (2014.01)
(58) Field of Classification Search
  USPC .................................................. 375/240.02
  See application file for complete search history.

(56) References Cited

U.S. PATENT DOCUMENTS

| | | | |
|---|---|---|---|
| 2006/0285768 | A1 | 12/2006 | Chen |
| 2014/0132769 | A1* | 5/2014 | Kido ............... G06V 20/584 382/104 |
| 2019/0058886 | A1 | 2/2019 | Chen et al. |
| 2019/0156468 | A1 | 5/2019 | Olivier et al. |
| 2019/0325567 | A1* | 10/2019 | Jones .................. G06T 5/60 |
| 2020/0184612 | A1* | 6/2020 | Marais ............... G06N 20/00 |
| 2021/0092461 | A1* | 3/2021 | Gadgil ................ H04N 19/98 |

FOREIGN PATENT DOCUMENTS

| | | |
|---|---|---|
| JP | 2019-097013 A | 6/2019 |
| TW | I588777 B | 6/2017 |
| WO | WO 2019169174 A1 | 9/2019 |
| WO | 2020/014034 A1 | 1/2020 |
| WO | 2020/018331 A1 | 1/2020 |
| WO | 2020/048790 A1 | 3/2020 |

OTHER PUBLICATIONS

Anonymous, "Parameter values for the HDTV standards for production and international programme exchange" International Telecommunication Union (ITU), ITU-R Radiocommunication Sector of ITU, BT Series, Broadcasting service (television), Recommendation ITU-R BT.709-5, Apr. 2002, 32 pages.
Anonymous, "High-Performance Single Layer High Dynamic Range (HDR) System for use in Consumer Electronics devices; Part 1: Directly Standard Dynamic Range (SDR) Compatible HDR System (SL-HDR1)", ETSI and European Broadcasting Union, ETSI TS 103 433-1 V1.3.1, Mar. 2020, 129 pages.
Salih et al., "Tone Mapping of HDR Images: A Review", 2012 4th International Conference on Intelligent and Advanced Systems (ICIAS 2012), Kuala Lumpur, Malaysia, Jun. 12, 2012, 6 pages.
Anonymous, "Information technology—Coding of audio-visual objects—Part 10: Advanced Video Coding", International Standard, ISO/IEC 14496-10, Second Edition, Dec. 15, 2005, 20 pages.
Anonymous, "High-Performance Single Layer High Dynamic Range (HDR) System for use in Consumer Electronics devices; Part 3: Enhancements for Hybrid Log Gamma (HLG) transfer function based High Dynamic Range (HDR) Systems (SL-HDR3)", EBU Operating Eurovision, European Broadcasting Union, ETSI TS 103 433-3 V1.1.1, Mar. 2020, 27 pages.
Anonymous, "High-Performance Single Layer High Dynamic Range (HDR) System for use in Consumer Electronics devices; Part 1: Directly Standard Dynamic Range (SDR) Compatible HDR System (SL-HDR1)", EBU Operating Eurovision, European Broadcasting Union, ETSI TS 103 433-1 V1.2.1, Aug. 2017, 123 pages.
Anonymous, "Information Technology—High efficiency Coding and Media Delivery in Heterogeneous Environments—Part 2: High Efficiency Video Coding", International Organization for Standardization, ISO/IEC JTC 1/SC 29/WG 11, ISO/IEC DIS 23008-2:201x(E), 4th Edition, Apr. 20, 2018, 874 pages.
Kotera et al. "Object to object color matchings by image clustering", IS&T's NIP Conference, International Conference on Digital Printing Technologies, Oct. 1, 1998, 5 pages.
Anonymous, "Parameter values for ultra-high definition television systems for production and international programme exchange", International Telecommunication Union (ITU), ITU-R Radiocommunication Sector of ITU, BT Series, Broadcasting service (television), Recommendation ITU-R BT.2020-2, Oct. 2015, 8 pages.
Anonymous, "High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)", ETSI and European Broadcasting Union, ETSI TS 103 433-2 V1.1.1, Jan. 2018, 46 pages.
Anonymous, "High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)", ETSI and European Broadcasting Union, ETSI TS 103 433-2 V1.2.1, Mar. 2020, 80 pages.
"3rd Revised Edition H.264/AVC Textbook", supervised by Okubo Sakae, Ed. 1, Impress R&D Corporation, ISBN: 978-4-8443-2664-9, Jan. 1, 2009, pp. 13-15.
Haan et al., "Indication of SMPTE ST 2094-20 metadata in HEVC", Document: JCTVC-X0075, [online], JCTVC-X0075 (version 2), Joint Collaborative Team on Video Coding (JCT-VC) of ITU-T SG 16 WP3 and ISO/IEC JTC 1/SC 29/WG 11, May 25, 2016, pp. 1-6.
Lachine et al., "Local Adaptive Tone Mapping for Video Enhancement", Proceedings of SPIE, vol. 9411, 94110V, <DOI: 10.1117/12.2087624>, Mar. 11, 2015, 6 pages.

* cited by examiner

CHROMA BOOST ON SDR AND HDR DISPLAY ADAPTED SIGNALS FOR SL-HDRx SYSTEMS

CROSS REFERENCE TO RELATED APPLICATIONS

This application is a U.S. National Stage Application under 35 U.S.C. 371 of International Patent Application No. PCT/EP2021/061060, filed Apr. 28, 2021, which is incorporated herein by reference in its entirety.

This application claims the benefit of European Patent Application No. 20305440.8, filed May 5, 2020.

1. TECHNICAL FIELD

At least one of the present embodiments generally relates to the field of distribution of HDR video using SL-HDRx systems (x=1, 2 or 3).

2. BACKGROUND

Recent advancements in display technologies are beginning to allow for an extended dynamic range of color, luminance and contrast in images to be displayed. The term image refers here to an image content that can be for example a video or a still picture or image.

High-dynamic-range video (HDR video) describes video having a dynamic range greater than that of standard-dynamic-range video (SDR video). HDR video involves capture, production, content/encoding, and display. HDR capture and displays are capable of brighter whites and deeper blacks. To accommodate this, HDR encoding standards allow for a higher maximum luminance and use at least a 10-bit dynamic range (compared to 8-bit for non-professional and 10-bit for professional SDR video) in order to maintain precision across this extended range.

While technically "HDR" refers strictly to a ratio between the maximum and minimum luminance, the term "HDR video" is commonly understood to imply wide color gamut as well.

Although a number of HDR display devices have appeared, as well as image cameras capable of capturing images with an increased dynamic range, there is still a very limited number of HDR contents available. Solutions allowing extending the dynamic range of existing contents so that these contents can be displayed efficiently on HDR display devices are needed.

The standard SL-HDR1 (ETSI TS 103 433-1 series, latest version is v1.3.1) provides direct backwards compatibility by using metadata allowing reconstructing a HDR signal from a SDR video stream that can be delivered using SDR distribution networks and services already in place. SL-HDR1 allows for HDR rendering on HDR devices and SDR rendering on SDR devices using a single layer video stream.

The standard SL-HDR2 (ETSI TS 103 433-2 series, latest version is v1.2.1) is adapted for HDR devices. The standard SL-HDR2 allows to transmit ST-2084 (a.k.a PQ (Perceptual Quantizer) or HDR10) streams along with metadata. When the stream is received by a device only compatible with ST-2084 but not compatible with metadata, the latter ignores the metadata and displays images without knowing all of their technical details (depending on the device models and their processing capacities, color rendering and level details may not respect the original source). When a device supporting the ST-2084 format and metadata receives the stream, it displays an optimized image that best respects the intent of the content producer.

The standard SL-HDR3 (ETSI TS 103 433-3 v1.1.1) allows transmitting HLG (Hybrid Log Gamma) streams along with metadata. A SL-HDR3 system comprises a HDR/SDR reconstruction block based on a SL-HDR2 HDR/SDR reconstruction block, i.e. it is made with a cascade of a HLG to ST-2084 OETF (Opto-Electronic Transfer Function) converter and a SL-HDR2 HDR/SDR reconstruction block. An OETF describes the action of a sensor, converting from scene brightness to data.

In the SL-HDRx systems, the chroma of SDR and HDR display adapted signals can be tuned thanks to color correction adjustment variables comprised in the SL-HDRx metadata. These color correction adjustment variables metadata are defining a piecewise function, known as SGF (Saturation Gain Function), that modifies a default color correction function that is in any SL-HDRx process. The color correction depends on the luminance (Y component of an image signal), i.e. the color correction modifies a color of a pixel (U and V components for example) in function of the luminance of said pixel.

Generally, SGF metadata define up to six points with coordinates (sgf_x, sgf_y), sgf_x representing a luminance and sgf_y representing a color correction at this luminance. The sgf_x and sgf_y coordinates are values for example comprised between "0" and "255".

By default, the SGF provides a default color correction that is identical for each luminance value. This default color correction, generally defined empirically, leads to neutral SDR and HDR display adapted signals.

A basic solution to increase the chroma of the SDR and HDR display adapted signals is to increase the chroma globally by having a different color correction for each of the luminance values. This solution suffers of some limitations:
- colors are controlled only globally. Therefore, if some colors are already saturated enough, adding a color correction to these colors will make them appear too saturated;
- adding uncontrolled color correction to colors, i.e. increasing the U and V values too much, may lead to U and V values that are out of range and this may lead to clipped U and V values and therefore to reconstruction errors.

It is desirable to overcome the above drawbacks.

It is particularly desirable to define a method allowing a better control of the color corrections in SL-HDR1, SL-HDR2 and SL-HDR3 systems, but also in any subsequent variant of SL-HDRx systems.

3. BRIEF SUMMARY

In a first aspect, one or more of the present embodiments provide a method comprising: obtaining a current RGB image; analyzing chrominance components of the current RGB image, the analysis comprising for each pixel of at least a subset of pixels of the current RGB image: deriving a luma component from the RGB components of said pixel; applying a tone mapping to the derived luma component to obtain a tone mapped luma component; deriving chrominance components from the RGB components of said pixel; and, applying a joint normalization and color correction to the chrominance components to obtain corrected normalized chrominance components; using the tone mapped luma component and the corrected normalized chrominance components to classify colors of pixels of the current RGB image in a plurality of classes; for each color class, determining data representative of said color class, comprising a dominant luminance value representative of a luminance at which a color in said class is predominant and determining from said data representative of said color class a value representative of a gain of chrominance representative of a margin for increasing a chrominance component in said color class; and, encoding the dominant luminance value and the value representative of the gain corresponding to each class as metadata representative of a Saturation Gain Function in a bitstream, said function defining a color correction to apply to a pixel in function of a luminance of said pixel.

In an embodiment, the current RGB image is comprised in a video sequence and a temporal filtering is applied to the information representative of the chroma gain based on information representative of chroma gains computed for images of the video sequence preceding the current RGB image.

In an embodiment, the temporal filtering is reinitialized at a beginning of the video sequence or when a scene cut is identified in the video sequence.

In an embodiment, the color classes are color sectors around a pure primary and/or secondary color in a chrominance plane.

In an embodiment, a combination of the sectors covers integrally the chrominance plane.

In an embodiment, determining data representative of said color class comprises obtaining an histogram of pixels in function of luminance values for the said color class.

In an embodiment, only pixels corresponding to luminance values comprised in a predefined range of values are used for obtaining the histogram.

In an embodiment, the dominant luminance value corresponds to a luminance value for which there is a maximum of pixels in the histogram or a luminance value for which there is a maximum chrominance energy, a chrominance energy being computed for a bin of the histogram by multiplying a number of pixels corresponding to that bin by a maximum chroma value found at that bin or a luminance value for which there is a maximum average chrominance energy, a average chrominance energy being computed for a bin of the histogram by multiplying a number of pixels corresponding to that bin by a maximum chroma value found at that bin.

In a second aspect, one or more of the present embodiments provide a device comprising: means for obtaining a current RGB image; means for analyzing chrominance components of the current RGB image, the means for analyzing comprising for each pixel of at least a subset of pixels of the current RGB image: means for deriving a luma component from the RGB components of said pixel; means for applying a tone mapping to the derived luma component to obtain a tone mapped luma component; means for deriving chrominance components from the RGB components of said pixel; and, means for applying a joint normalization and color correction to the chrominance components to obtain corrected normalized chrominance components; means for using the tone mapped luma component and the corrected normalized chrominance components to classify colors of pixels of the current RGB image in a plurality of classes; means for determining, for each color class, data representative of said color class, comprising a dominant luminance value representative of a luminance at which a color in said class is predominant and determining from said data representative of said color class a value representative of a gain of chrominance representative of a margin for increasing a chrominance component in said color class; and, means for encoding the dominant luminance value and the value representative of the gain corresponding to each class as metadata representative of a Saturation Gain Function in a bitstream, said function defining a color correction to apply to a pixel in function of a luminance of said pixel.

In an embodiment, the current RGB image is comprised in a video sequence and the device comprise temporal filtering means applied to the information representative of the chroma gain based on information representative of chroma gains computed for images of the video sequence preceding the current RGB image.

In an embodiment, the temporal filtering is reinitialized at a beginning of the video sequence or when a scene cut is identified in the video sequence.

In an embodiment, the color classes are color sectors around a pure primary and/or secondary color in a chrominance plane.

In an embodiment, a combination of the sectors covers integrally the chrominance plane.

In an embodiment, determining data representative of said color class comprises obtaining an histogram of pixels in function of luminance values for the said color class.

In an embodiment, only pixels corresponding to luminance values comprised in a predefined range of values are used for obtaining the histogram.

In an embodiment, the dominant luminance value corresponds to a luminance value for which there is a maximum of pixels in the histogram or a luminance value for which there is a maximum chrominance energy, a chrominance energy being computed for a bin of the histogram by multiplying a number of pixels corresponding to that bin by a maximum chroma value found at that bin or a luminance value for which there is a maximum average chrominance energy, a average chrominance energy being computed for a bin of the histogram by multiplying a number of pixels corresponding to that bin by a maximum chroma value found at that bin.

In a third aspect, one or more of the present embodiments provide a signal generated by the method of the first aspect or by the device of the second aspect.

In a fourth aspect, one or more of the present embodiments provide a computer program comprising program code instructions for implementing the method according to first aspect.

In a fifth embodiment, one or more of the present embodiments provide a information storage means storing program code instructions for implementing the method according to the first aspect.

4. BRIEF SUMMARY OF THE DRAWINGS

Figure 14:
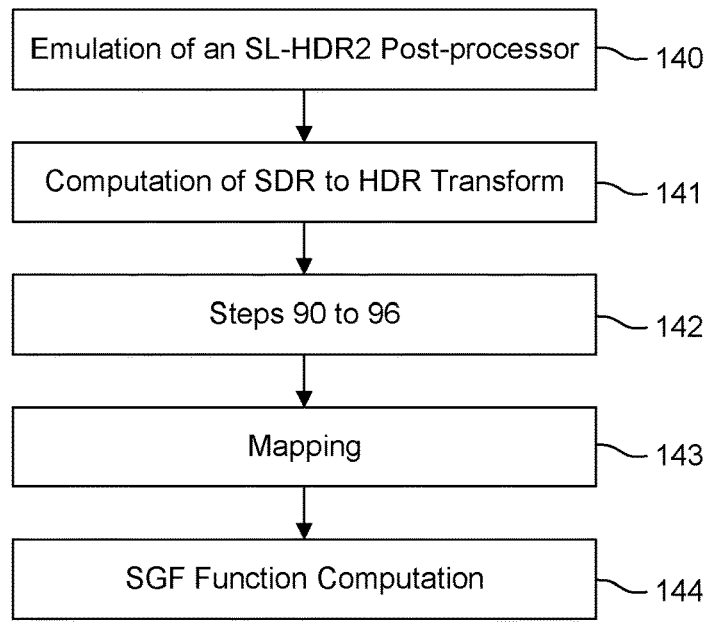
Figure 15:
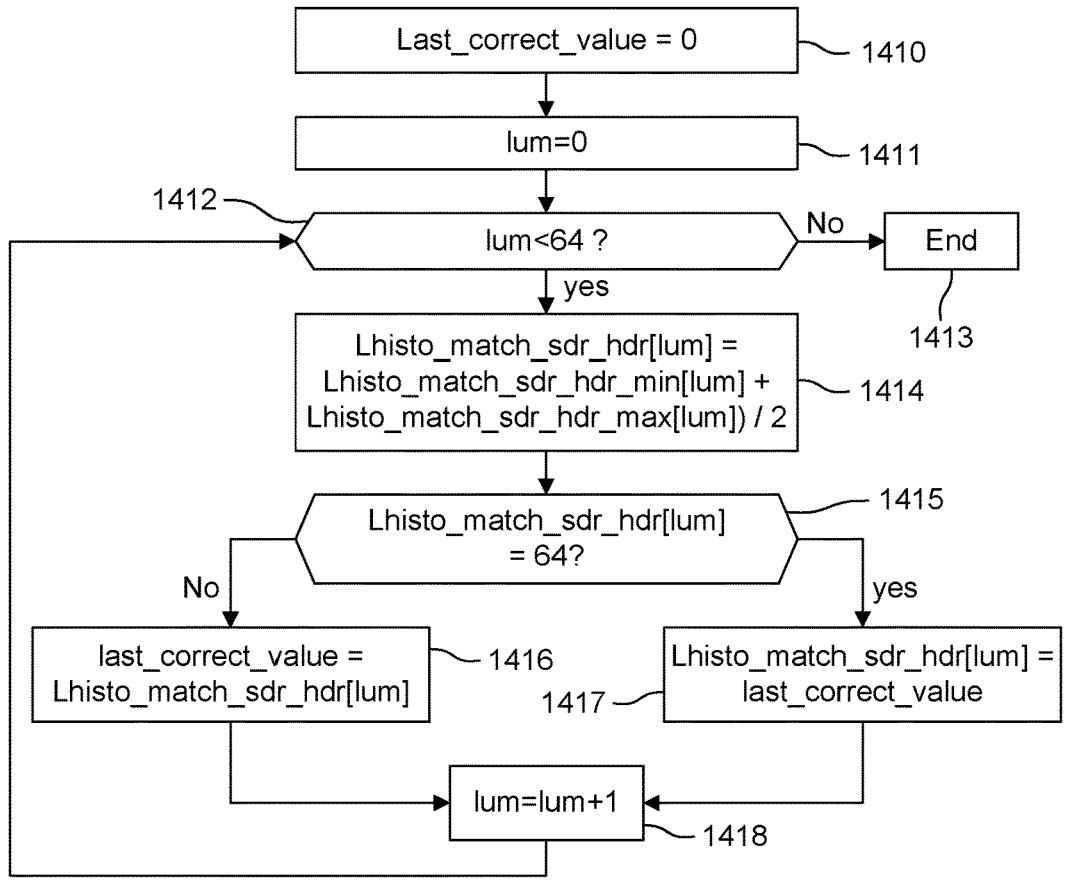
Figure 16:
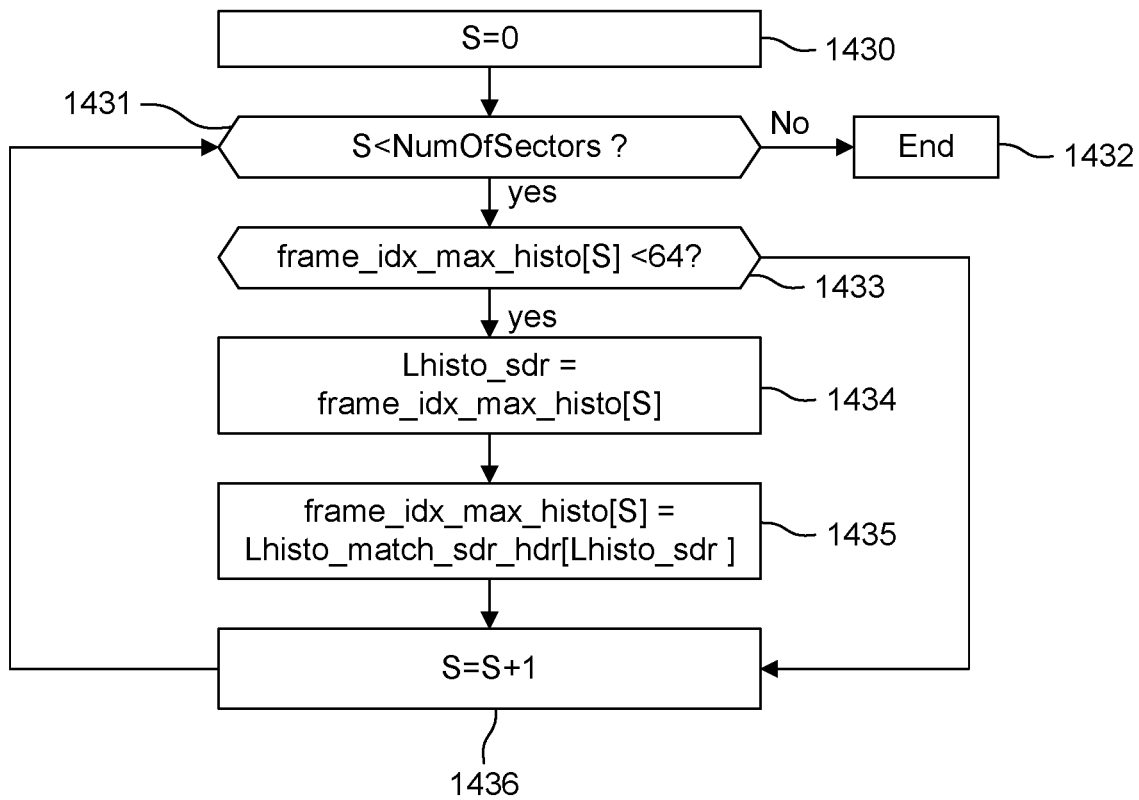

FIG. 14 describes schematically an embodiment of the method to control a color correction adapted to a SL-HDR2 system;

FIG. 15 illustrates a first detail of the method to control a color correction adapted to a SL-HDR2 system; and, FIG. 16 illustrates a second detail of the method to control a color correction adapted to a SL-HDR2 system.

5. DETAILED DESCRIPTION

Figure 1:
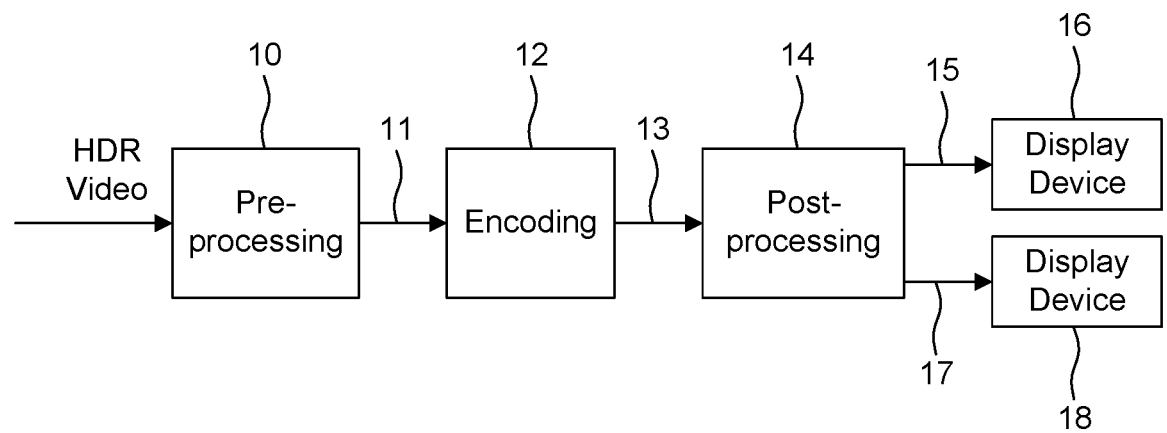
FIG. 1 illustrates an example of SL-HDRx system.

FIG. 1 illustrates an example of SL-HDRx system. The SL-HDRx (x=1, 2 or 3) comprises a pre-processing module 10, an encoding module 12 and a post-processing module 14. The pre-processing module 10 is communicatively connected to the encoding module 12 by a communication link 11. In SL-HDR2 and SL-HDR3 systems, the pre-processing module 10 generates a HDR content and dynamic metadata from an original content, while in SL-HDR1 system, the pre-processing module generates a SDR content and dynamic metadata from an original. The pre-processing module 10 integrates a computation part that generates the output HDR or SDR content and an analysis part that analyses the content and generates dynamic metadata. The original content could have been generated by an acquisition device, such as a camera, by a computer graphics system or by a combination of an acquisition device and a computer graphics system. The HDR or SDR content can comprise static metadata, for example, representative of an acquisition context of the HDR or SDR content such as acquisition device (i.e. camera) parameters.

The pre-processing module 10 is fed with HDR content that has been produced during post-production processes applied on the original HDR or SDR video to obtain a master video and static metadata. The post-production processes comprise for example:

- a color grading process for example introducing artistic effects in the master video;
- a VFX compositing process to introduce visual effects in the master video;
- a tone mapping process allowing generating an SDR master video from a HDR video;
- an inverse tone mapping process allowing generating a HDR master video from an SDR video.

The pre-processing module 10 then produces content and dynamic metadata, adapted the SL-HDRx use case. In SL-HDR1 systems, the generated video is a SDR video. In SL-HDR2 systems, the generated video is a PQ HDR video. In SL-HDR3 systems, the generated video is an HLG HDR video.

An example of pre-processing process implemented in an SL-HDR1 system is described below in relation with FIG. 6.

The encoding module 12 receives the generated video and the metadata, including both static metadata from the post-production and dynamic metadata from the SL-HDRx pre-processing, from the pre-processing module 10 and is in charge of encoding said generated video and metadata.

The encoding module 12, for example, generates an encoded video stream from the generated video and the metadata compliant with the video compression standards HEVC (ISO/IEC 23008-2-MPEG-H Part 2, High Efficiency Video Coding ITU-T H.265) or AVC (ISO/IEC 14496-10-MPEG-4 Part 10, Advanced Video Coding) or the standard entitled Versatile Video Coding (VVC) under development. The metadata are for example carried out by SEI messages such as the HEVC Color Remapping Information (CRI) or Mastering Display Colour Volume (MDCV) SEI messages.

In the following, we call input module the combination of the pre-processing module 10 and the encoding module 12.

When encoded, the encoded generated video is transmitted to the post-processing module 14 using a communication link 13.

Figure 2:
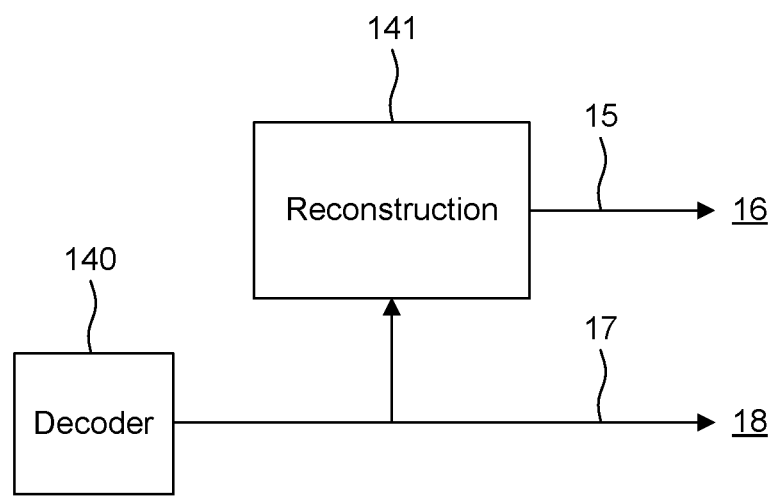
FIG. 2 illustrates schematically a post-processing module of a SL-HDRx system.

FIG. 2 illustrates schematically the post-processing module 14.

The post-processing module 14 comprises a decoder 140 adapted to decode the encoded master video and the associated metadata.

In a SL-HDR1 system, the encoded generated video represents a SDR video and the metadata are used to generate a HDR video from the SDR video. When decoded, in post-processing devices that do not integrate SL-HDR1, the SDR video is transmitted to a SDR display device 18 using a communication link 17. The SDR display device 18 then displays the decoded SDR video. In post-processing devices that integrate SL-HDR1, the post-processing module 14 comprises a reconstruction module 141. The reconstruction module 141 receives the decoded SDR video from the decoder 140 and reconstructs a HDR video from said decoded SDR video using the metadata. Said reconstructed HDR video is then transmitted to a HDR display device 16 which displays it. In some cases, the display device 16 is not a HDR display device but a SDR display device or a MDR (medium Dynamic Range) display device which is an intermediate between a SDR display device and a HDR display device. In these cases, the reconstruction module obtains information representative of the display capabilities of the MDR display device 16 and takes into account these capabilities during the reconstruction to reconstruct a video adapted to the MDR display device. Once reconstructed, the HDR (or SDR or MDR) video is transmitted to the HDR (or SDR or MDR) display device 16 using the communication link 15. The HDR (or SDR or MDR) display device 16 then displays the reconstructed HDR (or SDR or MDR) video.

In a SL-HDR2 system, the encoded generated video represents a PQ HDR video and the metadata are used to generate a SDR (or MDR) video from the decoded PQ HDR video. When decoded, in post-processing devices that do not integrate SL-HDR2, the PQ HDR video is transmitted to a HDR display device 18 using the communication link 17. The HDR display device 18 then displays the decoded PQ HDR video. In post-processing devices that do not integrate SL-HDR2, the reconstruction module 141 receives the decoded PQ HDR video from the decoder 140, the metadata and in some cases, display capabilities of the display device 16 that could be a SDR display device or a MDR display device or a HDR display device. From these data, the reconstruction module generates a video signal adapted to the display device 16 capabilities (SDR or MDR or HDR video). Once reconstructed, the SDR (or MDR or HDR) video is transmitted to the SDR (or MDR or HDR) display device 16 using the communication link 15. The SDR (or MDR or HDR) display device 16 then displays the reconstructed SDR (or MDR or HDR) video.

In a SL-HDR3 system, the encoded generated video represents a HLG HDR video and the metadata are used to generate an SDR (or MDR) video from the decoded HLG HDR video. The functioning of the post-processing module 14 in a SL-HDR3 system is very similar to the functioning of the post-processing module 14 in a SL-HDR2 system. A main difference is located in the reconstruction module 141. Indeed, in that case, the reconstruction module 141 comprises a cascade of a HLG to ST-2084 OETF converter and a SL-HDR2 reconstruction module as described above.

Figure 3:
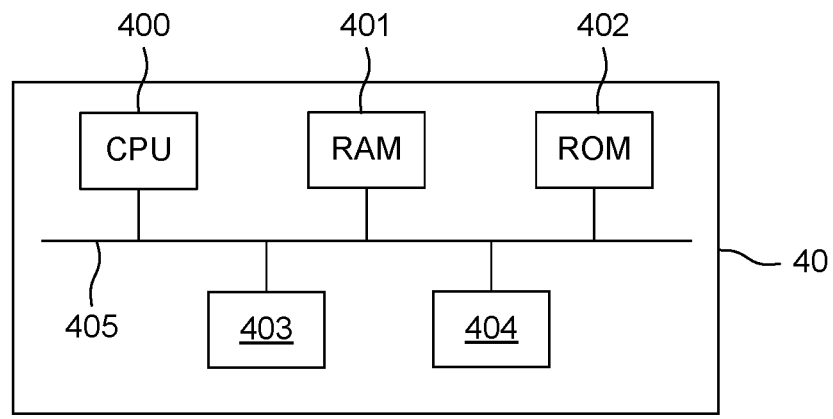
FIG. 3 illustrates schematically an example of hardware architecture of a processing module able to implement various aspects and embodiments.

FIG. 3 illustrates schematically an example of hardware architecture of a processing module 40 comprised in the pre-processing module 10, in the encoding module 12, in the input module or in the post-processing module 14 and able to implement different aspects and embodiments. The processing module 40 comprises, connected by a communication bus 405: a processor or CPU (central processing unit) 400 encompassing one or more microprocessors, general purpose computers, special purpose computers, and processors based on a multi-core architecture, as non-limiting examples; a random access memory (RAM) 401; a read only memory (ROM) 402; a storage unit 403, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 404 for exchanging data with other modules, devices, systems or equipment. The communication interface 404 can include, but is not limited to, a transceiver configured to transmit and to receive data over a communication channel 5. The communication interface 404 can include, but is not limited to, a modem or network card.

The communication interface 404 enables for instance the processing module 40:
  to receive a SDR or a HDR content and to output a master video when the processing module 40 is comprised in the pre-processing module 10;
  to receive a master video and to output an encoded master video comprising metadata when processing module 40 is comprised in the encoding module 12;
  to receive a SDR or HDR content and to output an encoded master video comprising metadata when the processing module 40 is comprised in the input module;
  to receive an encoded master video comprising metadata and to output a SDR, MDR and/or HDR video when processing module 40 is comprised in the post-processing module 40.

The processor 400 is capable of executing instructions loaded into the RAM 301 from the ROM 402, from an external memory (not shown), from a storage medium, or from a communication network. When the processing module 40 is powered up, the processor 400 is capable of reading instructions from the RAM 401 and executing them. These instructions form a computer program causing, for example, the implementation by the processor 400 of a pre-processing process, an encoding process, a decoding process or a post-processing process.

All or some of the algorithms and steps of said processes may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 4:
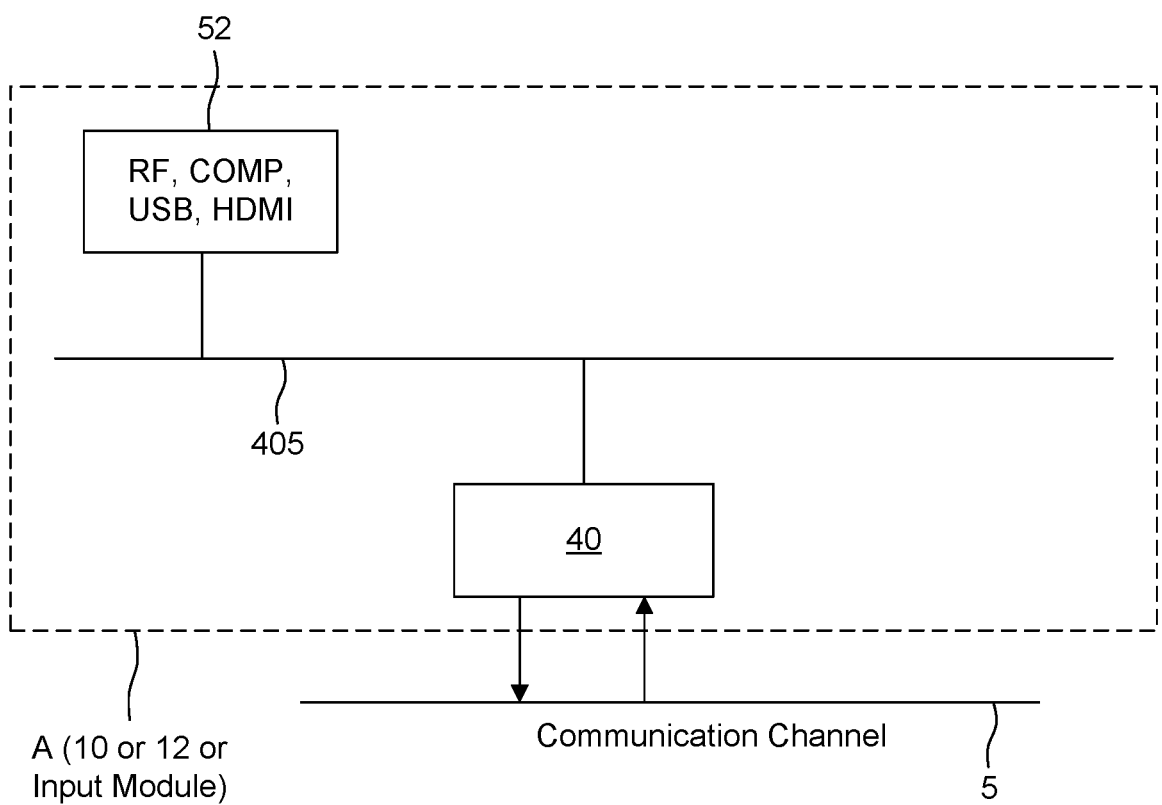
FIG. 4 illustrates a block diagram of an example of a first system in which various aspects and embodiments are implemented.

FIG. 4 illustrates a block diagram of an example of the system A adapted to implement a pre-processing module 10, an encoding module 12 or an input module and in which various aspects and embodiments are implemented. System A can be embodied as a device including the various components described below and is configured to perform one or more of the aspects and embodiments described in this document. Examples of such devices include, but are not limited to, various electronic devices such as personal computers, laptop computers, smartphones, tablet computers, connected home appliances, servers and a camera. Elements of system A, singly or in combination, can be embodied in a single integrated circuit (IC), multiple ICs, and/or discrete components. For example, in at least one embodiment, the system A comprises one processing module 40 that implement a pre-processing process, an encoding process or both. In various embodiments, the system A is communicatively coupled to one or more other systems, or other electronic devices, via, for example, a communications bus or through dedicated input and/or output ports.

The input to the processing module 40 can be provided through various input modules as indicated in block 52. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 4, include composite video.

In various embodiments, the input modules of block 52 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 3 to other electronic devices across USB and/or HDMI connections. It is to be understood that various aspects of input processing, for example, Reed-Solomon error correction, can be implemented, for example, within a separate input processing IC or within the processing module 40 as necessary. Similarly, aspects of USB or HDMI interface processing can be implemented within separate interface ICs or within the processing module 40 as necessary. The demodulated, error corrected, and demultiplexed stream is provided to the processing module 40.

Various elements of system A can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system A, the processing module 40 is interconnected to other elements of said system A by the bus 405.

The communication interface 404 of the processing module 40 allows the system A to communicate on the communication channel 5. The communication channel 5 can be implemented, for example, within a wired and/or a wireless medium.

Data is streamed, or otherwise provided, to the system A, in various embodiments, using a wireless network such as a Wi-Fi network, for example IEEE 802.11 (IEEE refers to the Institute of Electrical and Electronics Engineers). The Wi-Fi signal of these embodiments is received over the communications channel 5 and the communications interface 404 which are adapted for Wi-Fi communications. The communications channel 5 of these embodiments is typically connected to an access point or router that provides access to external networks including the Internet for allowing streaming applications and other over-the-top communications. Still other embodiments provide streamed data to the system A using the RF connection of the input block 52. As indicated above, various embodiments provide data in a non-streaming manner, for example, when the system A is a camera, a smartphone or a tablet. Additionally, various embodiments use wireless networks other than Wi-Fi, for example a cellular network or a Bluetooth network.

The system A can provide an output signal to various output devices using the communication channel 5 or the bus 405. For example, when implementing the pre-processing module 10, the system A provides the output signal to the encoding module 12 using the bus 405 or the communication channel 5. When implementing the encoding module 12 or the input module, the system A provides the output signal to the post-processing module 14 using the communication channel 5.

Various implementations involve applying a pre-processing process and or an encoding process. The pre-processing process or the encoding process, as used in this application, can encompass all or part of the processes performed, for example, on a received SDR or HDR image or video stream in order to produce a master video or an encoded master video with metadata. In various embodiments related to the encoding process, such process includes one or more of the processes typically performed by a video encoder, for example, an H.264/AVC (ISO/IEC 14496-10-MPEG-4 Part 10, Advanced Video Coding), H.265/HEVC (ISO/IEC 23008-2-MPEG-H Part 2, High Efficiency Video Coding/ ITU-T H.265) or H.266/VVC (Versatile Video Coding) under development by a joint collaborative team of ITU-T and ISO/IEC experts known as the Joint Video Experts Team (JVET)) encoder.

Figure 5:
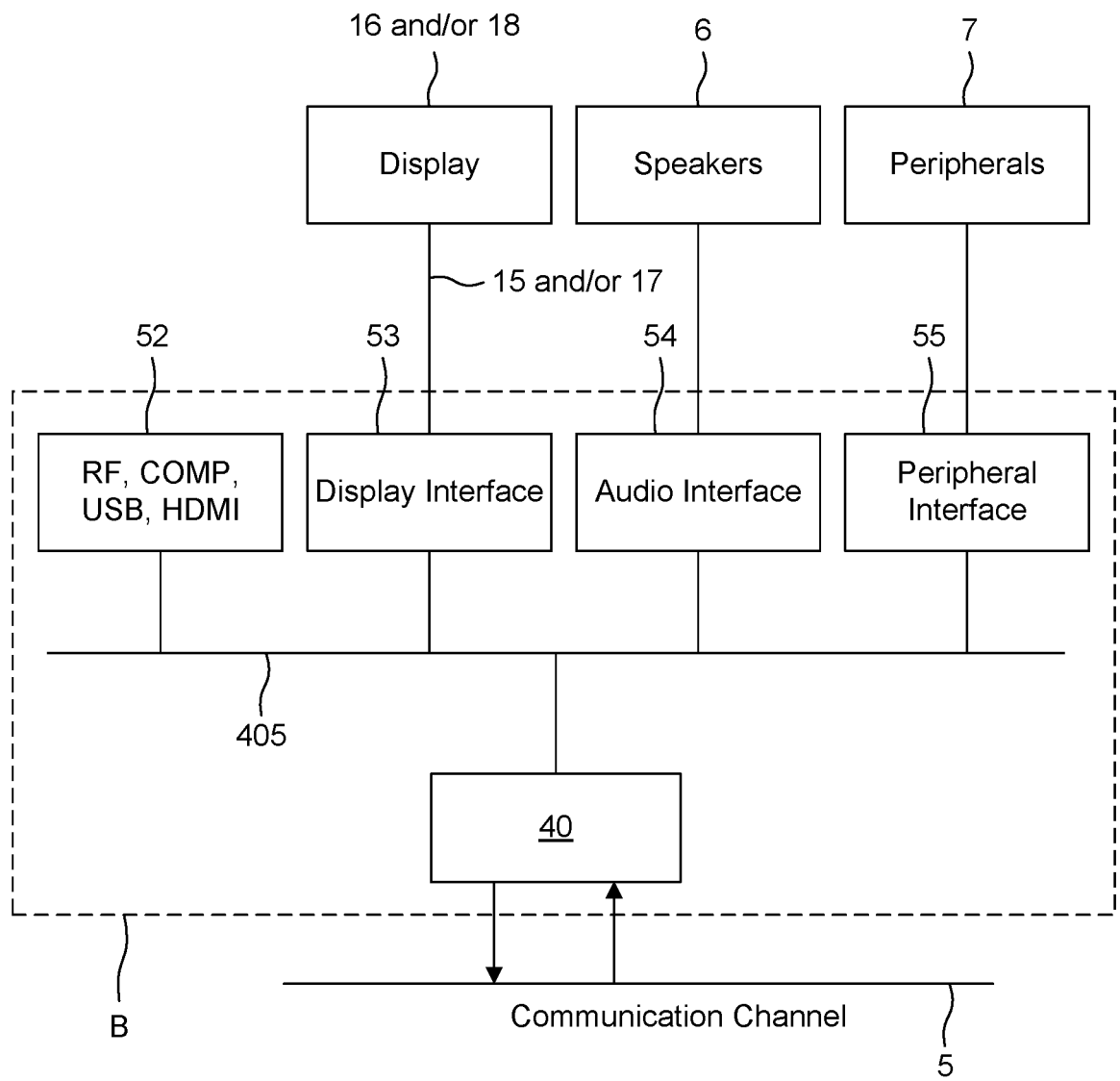
FIG. 5 illustrates a block diagram of an example of a second system in which various aspects and embodiments are implemented.

FIG. 5 illustrates a block diagram of an example of the system B adapted to implement a post-processing module 14 and in which various aspects and embodiments are implemented. System B can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system B, singly or in combination, can be embodied in a single integrated circuit (IC), multiple ICs, and/or discrete components. For example, in at least one embodiment, the system B comprises one processing module 40 that implement a post-processing process. In various embodiments, the system B is communicatively coupled to one or more other systems, or other electronic devices, via, for example, a communications bus or through dedicated input and/or output ports.

The input to the processing module 40 can be provided through various input modules as indicated in block 52. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 5, include composite video.

In various embodiments, the input modules of block 52 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system B to other electronic devices across USB and/or HDMI connections. It is to be understood that various aspects of input processing, for example, Reed-Solomon error correction, can be implemented, for example, within a separate input processing IC or within the processing module 40 as necessary. Similarly, aspects of USB or HDMI interface processing can be implemented within separate interface ICs or within the processing module 40 as necessary. The demodulated, error corrected, and demultiplexed stream is provided to the processing module 40.

Various elements of system B can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system B, the processing module 40 is interconnected to other elements of said system B by the bus 405.

The communication interface 404 of the processing module 40 allows the system B to communicate on the communication channel 5. The communication channel 5 can be implemented, for example, within a wired and/or a wireless medium.

Data is streamed, or otherwise provided, to the system B, in various embodiments, using a wireless network such as a Wi-Fi network, for example IEEE 802.11 (IEEE refers to the Institute of Electrical and Electronics Engineers). The Wi-Fi signal of these embodiments is received over the communications channel 5 and the communications interface 404 which are adapted for Wi-Fi communications. The communications channel 5 of these embodiments is typically connected to an access point or router that provides access to external networks including the Internet for allowing streaming applications and other over-the-top communications. Still other embodiments provide streamed data to the system B using the RF connection of the input block 52. As indicated above, various embodiments provide data in a non-streaming manner. Additionally, various embodiments use wireless networks other than Wi-Fi, for example a cellular network or a Bluetooth network.

The system B can provide an output signal to various output devices, including the display 5, speakers 6, and other peripheral devices 7. The display 5 of various embodiments includes one or more of, for example, a touchscreen display, an organic light-emitting diode (OLED) display, a curved display, and/or a foldable display. The display 5 can be for example the display devices 16 or 18 of FIG. 1. The display 5 can be for a television, a tablet, a laptop, a cell phone (mobile phone), or other devices. The display 5 can also be integrated with other components (for example, as in a smart phone), or separate (for example, an external monitor for a laptop). The display device 5 is SDR, MDR or HDR content compatible. The other peripheral devices 7 include, in various examples of embodiments, one or more of a stand-alone digital video disc (or digital versatile disc) (DVR, for both terms), a disk player, a stereo system, and/or a lighting system. Various embodiments use one or more peripheral devices 7 that provide a function based on the output of the system B. For example, a disk player performs the function of playing the output of the system B.

In various embodiments, control signals are communicated between the system B and the display 5, speakers 6, or other peripheral devices 7 using signaling such as AV.Link, Consumer Electronics Control (CEC), or other communications protocols that enable device-to-device control with or without user intervention. The output devices can be communicatively coupled to system B via dedicated connections through respective interfaces 53, 54, and 55. Alternatively, the output devices can be connected to system B using the communications channel 5 via the communications interface 404. The display 5 and speakers 6 can be integrated in a single unit with the other components of system B in an electronic device such as, for example, a television. In various embodiments, the display interface 5 includes a display driver, such as, for example, a timing controller (T Con) chip.

The display 5 and speaker 6 can alternatively be separate from one or more of the other components, for example, if the RF module of input 52 is part of a separate set-top box. In various embodiments in which the display 5 and speakers 6 are external components, the output signal can be provided via dedicated output connections, including, for example, HDMI ports, USB ports, or COMP outputs.

Various implementations involve applying a post processing process comprising a decoding process. The post processing process, as used in this application, can encompass all or part of the processes performed, for example, on a received encoded master video in order to produce a SDR, MDR or HDR output suitable for display. In various embodiments, such processes include one or more of the processes typically performed by an image or a video decoder, for example, an H.264/AVC (ISO/IEC 14496-10-MPEG-4 Part 10, Advanced Video Coding), H.265/HEVC (ISO/IEC 23008-2-MPEG-H Part 2, High Efficiency Video Coding/ITU-T H.265) or and H.266/VVC (Versatile Video Coding) under development by a joint collaborative team of ITU-T and ISO/IEC experts known as the Joint Video Experts Team (JVET))decoder.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations or embodiments can produce a variety of signals formatted to carry information that can be, for example, stored or transmitted. The information can include, for example, instructions for performing a method, or data produced by one of the described implementations or embodiments. For example, a signal can be formatted to carry a SDR or HDR image or video sequence of a described embodiment. Such a signal can be formatted, for example, as an electromagnetic wave (for example, using a radio frequency portion of spectrum) or as a baseband signal. The formatting can include, for example, encoding a SDR or HDR image or video sequence with metadata in an encoded stream and modulating a carrier with the encoded stream. The information that the signal carries can be, for example, analog or digital information. The signal can be transmitted over a variety of different wired or wireless links, as is known. The signal can be stored on a processor-readable medium.

Figure 6:
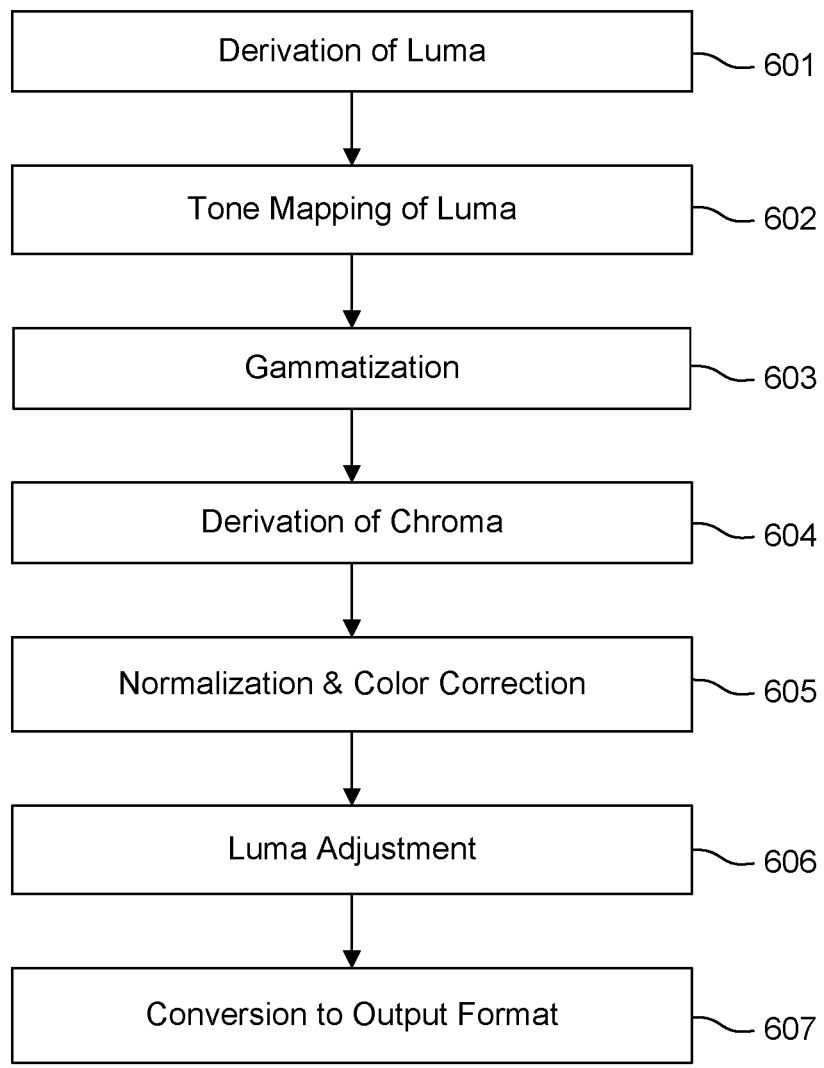
FIG. 6 illustrates schematically a first example of pre-processing process.

FIG. 6 illustrates schematically an example of the computation part of the pre-processing process. The first example of pre-processing process is adapted to a SL-HDR1 system in NCL (Non Constant Luminance) mode. In this example, the pre-processing module 10 receives a HDR content and generates a master video representative of a SDR content and metadata. The pre-processing process is executed by the processing module 40, on each pixel of each image of the HDR content. In the example of FIG. 6, a pixel comprises three color components corresponding to the primary colors Red (R), Green (G) and Blue (B), i.e. a pixel is a RGB signal.

In a step 601, the processing module 40 derives a luminance (luma) component L' from the RGB signal as follows:

$$L' = A_1 \begin{bmatrix} R^{\frac{1}{\gamma}} \\ G^{\frac{1}{\gamma}} \\ B^{\frac{1}{\gamma}} \end{bmatrix} \quad \text{(eq. 1)}$$

where $A_1$ is a conversion matrix and $\gamma$ is gamma factor for example equal to "2.4".

In a step 602, the processing module 40 applies a tone mapping to the luma component L' to obtain a tone mapped value $Y_{pre0}$ as follows:

$$Y_{pre0} = LUT_{TM}(L') \quad \text{(eq. 2)}$$

where $Y_{pre0} \in [0; 1023]$ and $LUT_{TM}()$ is a Look Up Table representative of a tone mapping function.

In a step 603, the processing module 40 applies a gammatization to the RGB signal as follows:

$$\begin{bmatrix} R_S \\ G_S \\ B_S \end{bmatrix} = \begin{bmatrix} R^{\frac{1}{\gamma}} \\ G^{\frac{1}{\gamma}} \\ B^{\frac{1}{\gamma}} \end{bmatrix} \quad \text{(eq. 3)}$$

In a step 604, the processing module 40 derives chrominance (chroma) components (Chroma) from the gammatized RGB signal as follows:

$$\begin{bmatrix} U_{pre0} \\ V_{pre0} \end{bmatrix} = \begin{bmatrix} A_2 \\ A_3 \end{bmatrix} \begin{bmatrix} R_S \\ G_S \\ B_S \end{bmatrix} * 1024 \quad \text{(eq. 4)}$$

where $A_2$ and $A_3$ are conversion matrix. $[A_1 A_2 A_3]^T$ is for example the canonical 3×3 RGB-to-YUV conversion matrix (e.g. as specified in ITU-R Rec. BT.2020 or ITU-R Rec. BT.709 depending on the color space).

In a step 605, the processing module 40 applies a joint normalization and color correction to the chroma components $U_{pre0}$ and $V_{pre0}$ to obtain normalized corrected chroma components $U_{pre1}$ and $V_{pre1}$ as follows:

$$\begin{bmatrix} U_{pre1} \\ V_{pre1} \end{bmatrix} = \frac{1}{\beta_0(Y_{preo})} \cdot \begin{bmatrix} U_{pre0} \\ V_{pre0} \end{bmatrix} = \frac{1024}{\beta_0(Y_{preo})} \cdot \begin{bmatrix} A_2 \\ A_3 \end{bmatrix} \begin{bmatrix} R^{\frac{1}{\gamma}} \\ G^{\frac{1}{\gamma}} \\ B^{\frac{1}{\gamma}} \end{bmatrix} \quad \text{(eq. 5)}$$

$U_{pre1}$ and $V_{pre1}$ being clipped in $[-512; 511]$. $\beta_0(Y_{pre0})$ is a scaling function:

$$\beta_0(Y_{pre0}) = lutCC[Y_{post2}] \times (invLUT[Y_{post2}])^{\frac{1}{\gamma}} \times 1024$$

and as $$(invLUT[Y_{post2}])^{\frac{1}{\gamma}} = L'$$

then:

$$\beta_0(Y_{pre0}) = \text{lutCC}[Y_{post2}] \times L' \times 1024$$

where lutCC[ ] is a color correction look-Up Table for example defined in section 7.2.3.2 of document ETSI TS 103 433-1 v1.3.1.

In a step 606, the processing module 40 applies an adjustment to the tone mapped luma value $Y_{pre0}$ to obtain an adjusted tone mapped luma value $Y_{pre1}$ as follows:

$$Y_{pre1} = Y_{pre0} - \max(0, a \cdot U_{pre1} + b \cdot V_{pre1}) \quad (\text{eq. 6})$$

In a step 607, the processing module 40 converts the luma and chroma values $Y_{pre1}$, $U_{pre1}$ and $V_{pre1}$ in an given output format. Step 607 comprises a sub-step of adding a value midsample for example equal to "512" to the chroma components $U_{pre1}$ and $V_{pre1}$, optionally a sub-step of down-sampling the chroma components that compresses the signal by reducing the number of chroma samples, and optionally a sub-step of converting from full range values (YUV components range from "0" to "1023" when encoded in 10 bits) to limited range values (Y component ranges from 64 to 940, and UV components range from 64 to 960) to obtain the luma and chroma components $Y_{sdr}$, $U_{sdr}$, $V_{sdr}$ representative of a pixel of a SDR signal. The objective of step 607 is for example to convert a full range YUV 444 signal in a limited range YUV 420 signal.

Figure 7:
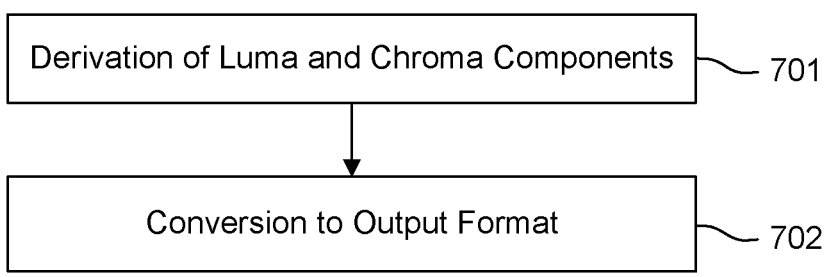
FIG. 7 illustrates schematically a second example of pre-processing process.

FIG. 7 illustrates schematically a second example of the computation part of the pre-processing process. The second example of the computation part of the pre-processing process is adapted to a SL-HDR2 system. In this example, the pre-processing module 10 receives a HDR content and generates a master video representative of a HDR PQ signal and metadata. The pre-processing process is executed by the processing module 40, on each pixel of each image of the input HDR content. In the example of FIG. 7, again, a pixel is a RGB signal.

In a step 701, the processing module 40 obtains luma and chroma components $Y_{pre0}$, $U_{pre0}$, $V_{pre0}$ of a PQ signal from the RGB signal:

$$\begin{bmatrix} Y_{pre0} \\ U_{pre0} \\ V_{pre0} \end{bmatrix} = A_1 \begin{bmatrix} R'' \\ G'' \\ B'' \end{bmatrix}$$

where $A_1$ is a conversion function and R" (respectively G" and B") is obtained from the RGB signal using a RGB to PQ OETF converter.

In a step 702, the processing module 40 converts the luma and chroma values $Y_{pre0}$, $U_{pre0}$ and $V_{pre0}$ in an output format. Step 702 comprises a sub-step of adding a value midsample for example equal to "512" to the chroma components $U_{pre0}$ and $V_{pre0}$, optionally a sub-step of down-sampling the chroma components that compresses the signal by reducing the number of chroma samples, and optionally a sub-step of converting from full range values (YUV components range from "0" to "1023" when encoded in 10 bits) to limited range values (Y component ranges from 64 to 940, and UV components range from 64 to 960) to obtain the luma and chroma components $Y_{hdr}$, $U_{hdr}$, $V_{hdr}$ representative of a pixel of a HDR signal. The objective of step 702 is for example to convert a full range YUV 444 signal in a limited range YUV 420 signal.

Figure 8:
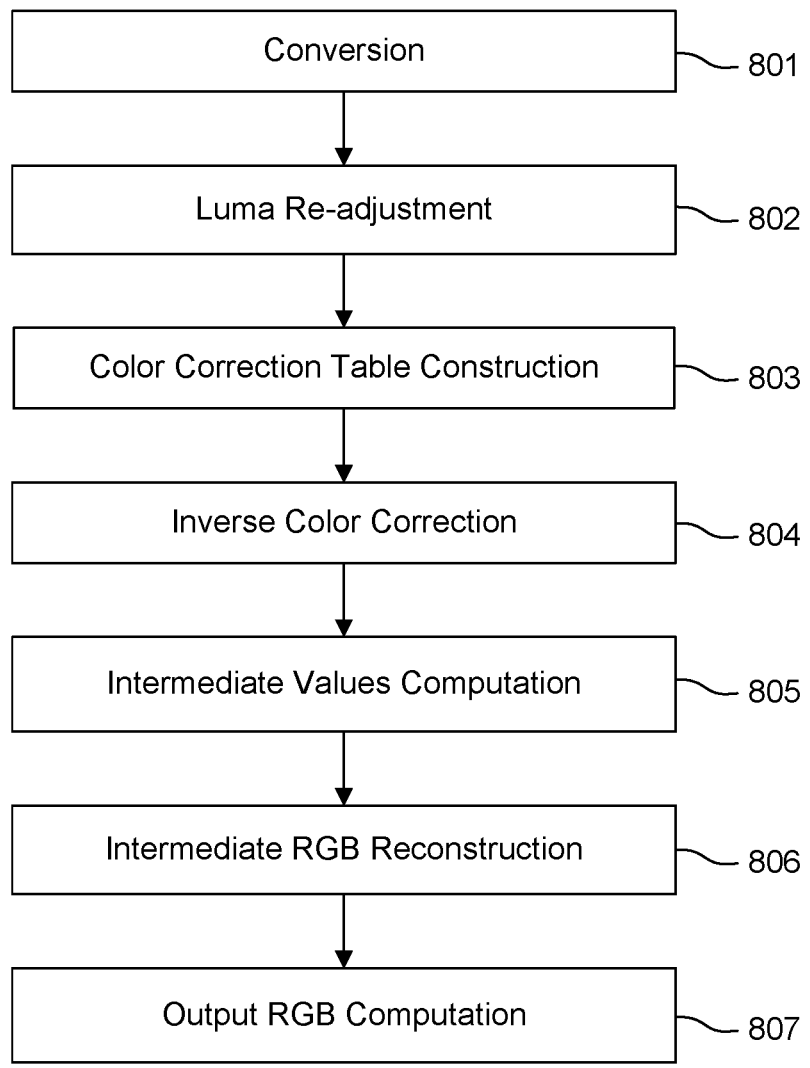
FIG. 8 illustrates schematically an example of reconstruction process of a post-processing process.

FIG. 8 illustrates schematically an example of reconstruction process of a post-processing process. The process of FIG. 8 is executed by the processing module 40 when the processing module 40 implements the post-processing module 14 and more particularly the reconstruction module 141. The reconstruction process is applied to each pixel of the decoded master video generated by the decoder 140. In the following adaptation of the reconstruction process to SL-HDR1 and SL-HDR2 are described. Since SL-HDR3 specification is based on the SL-HDR2 specification, all SL-HDR2 specificities apply also for SL-HDR3 in the following. The reconstruction process of FIG. 8 follows for example the pre-processing processes of FIG. 6 or FIG. 7. Hence, the signal outputted by the pre-processing process is the input signal of the reconstruction process. The reconstruction process receives therefore a limited range YUV 420 signal.

In a step 801, the processing module 40 converts the received YUV 420 signal to a full range YUV 444 signal (inverse process of steps 607 and 702).

In case of an SL-HDR1 system, the YUV 420 signal is a SDR pixel. Once converted, the SDR pixel is represented by the luma and chroma components $SDR_y$, $SDR_{cb}$, $SDR_{cr}$.

In case of an SL-HDR2 system, the YUV 420 signal is a HDR pixel. Once converted, the HDR pixel is represented by the luma and chroma components $HDR_y$, $HDR_{cb}$, $HDR_{cr}$.

After conversion, the processing module 40 centers the chroma components to obtain centered chroma components $U_{post1}$ and $V_{post1}$. In case of a SL-HDR1 system, the centering is performed as follows:

$$\begin{cases} U_{post1} = SDR_{cb} - midsample \\ V_{post1} = SDR_{cr} - midsample \end{cases}$$

In case of a SL-HDR2 system, the centering is performed as follows:

$$\begin{cases} U_{post1} = HDR_{cb} - midsample \\ V_{post1} = HDR_{cr} - midsample \end{cases}$$

Where midsample is for example equal to "512".

In a step 802, the processing module 40 applies a re-adjustment to the luma component. In case of a SL-HDR1 system, the re-adjustment operation is as follows:

$$Y_{post1} = SDR_y + \max(0; mu_0 \times U_{post1} + mu_1 \times V_{post1})$$

where the parameters $mu_0$ and $mu_1$ are defined in section 7.2.4 of document ETSI TS 103 433-1 v1.3.1 and max (x,y) taking the maximum of x and y.

In case of a SL-HDR2 system, the re-adjustment operation is simpler:

$$Y_{post1} = HDR_y$$

In SL-HDR1 and SL-HDR2, the luma value $Y_{post1}$ is then clipped in [0; 1023] to obtain $Y_{post2}$.

In a step 803, the processing module 40 constructs a color correction Look-Up Table lutCC[Y].

In case of SL-HDR1, the construction of the color correction look-up table is specified in section 7.2.3.2 of the document ETSI TS 103 433-1 v1.3.1:

$$lutCC[y] = \min\left(lutCC[0]; \frac{1}{\max(R_{sgf} \div 255; R_{sgf} \times g(Y_n))} \times L(Y_n)\right)$$

with lutCC[0]=0.125 and $R_{sgf}$, $g(Y_n)$, $L(Y_n)$ specified in the document ETSI TS 103 433-1 v1.2.1.

In case of SL-HDR2, the construction of the color correction look-up table is specified in section 7.2.3.2 of the document ETSI TS 103 433-2 v1.2.1:

$$lutCC[y] = \min\left(lutCC[0]; \frac{1 + c(L_{HDR}; L_{SDR}; L_{pdisp}) \times Y_n^{2.4}}{Y_n^{2.4} \times \max(R_{sgf} \div 255, R_{sgf} \times g(Y_n))} \times \frac{1}{maxsampleVal - 1}\right)$$

with lutCC[0]–0.125 and $c(L_{HDR}; L_{SDR}; L_{pdisp})$, $R_{sgf}$, $g(Y_n)$, maxsampleVal specified in the document ETSI TS 103 433-2 v1.2.1.

In both SL-HDR1 and SL-HDR2 cases, $g(Y_n)$ is defined as:

$$g(Y_n) = f_{sgf}(Y_n) \times modFactor + (1 - modFactor) \div R_{sgf}$$

Where the saturation gain function $f_{sgf}(Y_n)$ is derived from the piece-wise linear pivot points defined by the Saturation Gain Function metadata sgf_x and sgf_y, as detailed in clause 7.3 of the document ETSI TS 103 433-1 v1.3.1.

In a step 804, the processing module 40 applies an inverse color correction to the centered chroma components $U_{post1}$ and $V_{post1}$ using the constructed color correction look-up table lutCC[y].

In case of SL-HDR1, the inverse color correction is described in section 7.2.4 of the document ETSI TS 103 433-1 v1.3.1:

$$\begin{cases} U_{post2} = lutCC[Y_{post2}] \times U_{post1} \\ V_{post2} = lutCC[Y_{post2}] \times V_{post1} \end{cases}$$

In case of SL-HDR2, the inverse color correction is described in section 7.2.4 of the document ETSI TS 103 433-2 v1.2.1:

$$\begin{cases} U_{post2} = lutCC[Y_{post2}] \times U_{post1} \times maxCoeff \div m_3 \\ V_{post2} = lutCC[Y_{post2}] \times V_{post1} \times maxcoeff \div m_3 \end{cases}$$

In a step 805, the processing module computes intermediate values $S_0$, $U_{post3}$ and $V_{post3}$. In case of SL-HDR1, a variable T is computed as follows:

$$T = k_o \times U_{post2} \times V_{post2} + k_1 \times U_{post2} \times U_{post2} + k_2 \times V_{post2} \times V_{post2}$$

With $k_1$ and $k_2$ described in section 7.2.4 of the document ETSI TS 103 433-1 v1.2.1.

If T≤1, $S_0 = \sqrt{1-T}$, $U_{post3} = U_{post2}$ and $V_{post3} = V_{post2}$.

Otherwise, if T>1, $S_0 = 0$, $U_{post3}$ and $V_{post3}$ are derived as follows:

$$\begin{cases} U_{post3} = \dfrac{U_{post2}}{\sqrt{T}} \\ V_{post3} = \dfrac{V_{post2}}{\sqrt{T}} \end{cases}$$

This last equation is only for SL-HDR1 "CL" mode. In SL-HDR1 "NCL mode" and SL-HDR2, $k_o = k_1 = k_2 = 0$, $S_0 = 1$ and $U_{post3} = U_{post2}$ and $V_{post3} = V_{post2}$.

One can note that $Y_{post2}$ corresponds to $Y_{pre0}$, $U_{post1}$ and $V_{post1}$ corresponds respectively to $U_{pred1}$ and $V_{pred1}$.

In a step 806, the processing module computes intermediate RGB reconstruction values $R_2$, $G_2$ and $B_2$. This is done in two steps.

In case of SL-HDR1, $R_1$, $G_1$ and $B_1$ computation is described in section 7.2.4 of the document ETSI TS 103 433-1 v1.3.1:

$$\begin{bmatrix} R_1 \\ G_1 \\ B_1 \end{bmatrix} = \begin{bmatrix} 1 & 0 & m_0 \\ 1 & m_1 & m_2 \\ 1 & m_3 & 0 \end{bmatrix} \times \begin{bmatrix} S_0 \\ U_{post3} \\ V_{post3} \end{bmatrix}$$

Where $m_i$=matrixCoefficient[i] are part of the SL-HDRx metadata described in section 6.3.2.6 of the document ETSI TS 103 433-1 v1.3.1.

In case of SL-HDR2, $R_1$, $G_1$ and $B_1$ computation is described in section 7.2.4 of the document ETSI TS 103 433-2 v1.2.1:

$$\begin{bmatrix} R_1 \\ G_1 \\ B_1 \end{bmatrix} = \begin{bmatrix} 1 & 0 & m_0 \\ 1 & m_1 & m_2 \\ 1 & m_3 & 0 \end{bmatrix} \times \begin{bmatrix} 1 \\ U_{post2} \\ V_{post2} \end{bmatrix}$$

Where $m_i$=matrixCoefficient[i] are part of the SL-HDRx metadata described in section 6.3.2.6 of the document ETSI TS 103 433-1 v1.3.1.

In a second step, intermediate $R_2$, $G_2$ and $B_2$ are computed, as described in section 7.2.4 of the documents ETSI TS 103 433-1 v1.3.1 for SL-HDR1 and ETSI TS 103 433-2 v1.2.1 for SL-HDR2:

$$\begin{cases} R_2 = lutMapY[Y_{post2}] \times R_1, \; G_2 = lutMapY[Y_{post2}] \times G_1 \\ \qquad\qquad B_2 = lutMapY[Y_{post2}] \times B_1 \end{cases}$$

LutMapY computation is detailed in section 7.2.3.1 of the documents ETSI TS 103 433-1 v1.3.1 for SL-HDR1 and ETSI TS 103 433-2 v1.2.1 for SL-HDR2.

It should be noted that in case of SL-HDR1, LutMapY acts as an inverse Tone Mapping Look-Up table that transforms the SDR $SDR_y$ input luma signal of the SL-HDR1 post-processor into a HDR output signal or a SDR or MDR output signal in case of adaptation to the display.

In case of SL-HDR2, LutMapY acts as a Tone Mapping Look-Up table that transforms the HDR $HDR_y$ input luma signal of the SL-HDR2 post-processor into a HDR output signal or a SDR or MDR output signal in case of adaptation to the display.

In a step 807, the output HDR RGB reconstructed signals $HDR_R$, $HDR_G$ and $HDR_B$ are computed.

In case of SL-HDR1, the computation is described in section 7.2.4 of the document ETSI TS 103 433-1 v1.3.1:

$$\begin{cases} HDR_R[x][y] = L_{HDR} \times R_2^\gamma \\ HDR_G[x][y] = L_{HDR} \times G_2^\gamma \\ HDR_B[x][y] = L_{HDR} \times B_2^\gamma \end{cases}$$

In case of SL-HDR2, the computation is described in section 7.2.4 of the document ETSI TS 103 433-2 v1.2.1:

$$\begin{cases} HDR_R[x][y] = 10000 \times PQ_{EOTF}(R_2) \\ HDR_G[x][y] = 10000 \times PQ_{EOTF}(G_2) \\ HDR_B[x][y] = 10000 \times PQ_{EOTF}(B_2) \end{cases}$$

The color correction of a SL-HDRx system can therefore be controlled using the sgf_x and sgf_y metadata that have an impact on the color correction look-up table lutCC [$Y_{post2}$] that control the saturation of the chroma components. In case of SL-HDR1, sgf_x and sgf_y metadata will control the generation of $U_{pre1}$ and $V_{pre1}$ in step 605 of the HDR decomposition process, and therefore will control the $U_{sdr}$, $V_{sdr}$ SDR outputs. In case of SL-HDR2, sgf_x and sgf_y metadata will control the generation of $U_{post2}$ and $V_{post3}$ in step 804 of the processing module 40, and therefore will control the chroma outputs of the SL-HDR2 reconstruction process.

Figure 9:
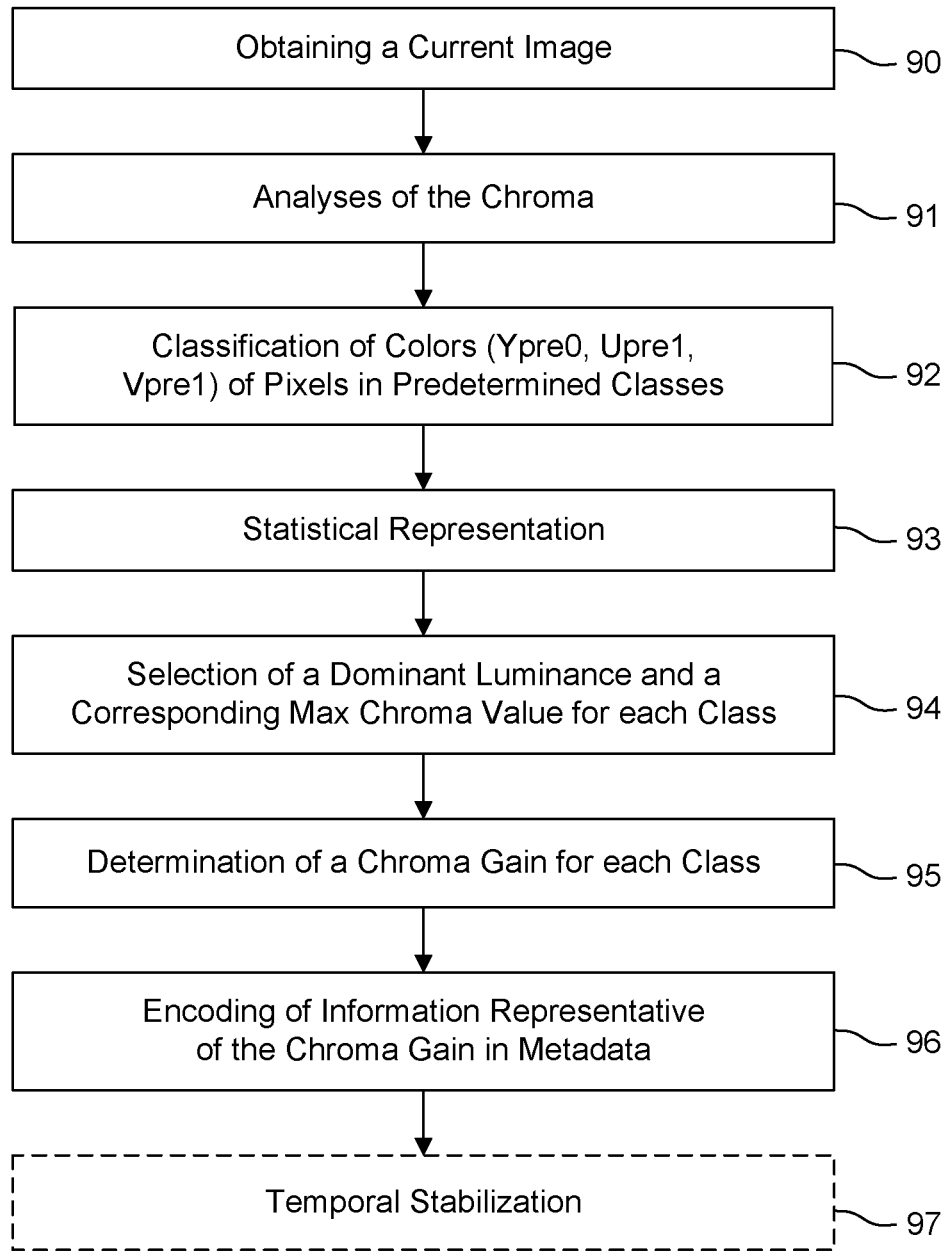
FIG. 9 illustrates schematically a method to control a color correction in a SL-HDRx system.

FIG. 9 illustrates schematically a method for controlling a color correction in a SL-HDRx system. The method described in relation to FIG. 9 is executed by the processing module 40 when the processing module 40 implements the pre-processing module 10 or the input module. The method is applied to an image or to each image of a video. The method of FIG. 9 is described in the context of a SL-HDR1 system in NCL mode. The processing module 40 receives a HDR content.

In a step 90, the processing module 40 obtains a current image of the HDR content.

In a step 91, the processing module 40 analyses the chroma of the current image. To do so the processing module 40 applies the process of FIG. 6 until step 605 to obtain for each pixel of the current image the three color components $Y_{pre0}$, $U_{pre1}$ and $V_{pre1}$.

In a step 92, the processing module 40 classifies the colors of pixels of the current image, represented by the three components $Y_{pre0}$, $U_{pre1}$ and $V_{pre1}$ in color classes. In one embodiment of step 92, six classes are used:
- three classes corresponding to the three primary colors Red, Green and Blue;
- three classes corresponding to the three secondary colors Magenta, Cyan and Yellow.

Each color can be represented in many different color spaces. In an embodiment, RGB and its polar coordinates Hue (H) and Chroma (C) are used. The Hue (H) and Chroma (C) are computed as follow:

$$C = \sqrt{(U^2 + V^2)}$$

$$V = \arctan\left(\frac{V}{U}\right)$$

In the case of SL-HDR1, $$C = \sqrt{(U_{pre1}^2 + V_{pre1}^2)}$$

$$V = \arctan\left(\frac{V_{pre1}}{U_{pre1}}\right)$$

A direction is defined for each of the three primary and three secondary colors by the following formulas in polar coordinates, with "c" in [0 . . . 1] being the normalized value of each of the RGB values (c=1 corresponds to the primary or secondary color, while c=0 is an achromatic origin of the UV plane):

Concerning the color Red (R=1, G=0, B=0):
$U_R$=au×c
$V_R$=av×c
$C_R=\sqrt{(au^2+av^2)}\times c$
$H_R$=arctan (av/au)

Where au and av are coefficients of a conversion matrix A allowing converting from RGB to YUV:

$$A = \begin{bmatrix} al & bl & cl \\ au & bu & cu \\ av & bv & cv \end{bmatrix}$$

$$A = \begin{bmatrix} 0.2627 & 0.678 & 0.0593 \\ -0.13963 & -0.36037 & 0.5 \\ 0.5 & -0.459786 & -0.040214 \end{bmatrix}$$

in the BT.2020 color gamut and $$A = \begin{bmatrix} 0.2126 & 0.7152 & 0.0722 \\ -0.114572 & -0.385428 & 0.5 \\ 0.5 & -0.454153 & -0.045847 \end{bmatrix}$$

in the BT.709 color gamut.

Concerning the color green (R=1, G=0, B=0):
$U_G$=bu×c
$V_G$=bv×c
$C_G=\sqrt{(bu^2+bv^2)}\times c$
$H_G$=arctan (bv/bu)

Concerning the color blue (R=1, G=0, B=0):
$U_B$=cu×c
$V_B$=cv×c
$C_B=\sqrt{(cu^2+cv^2)}\times c$
$H_B$=arctan (cv/cu)

Concerning the color magenta (R=1, G=0, B=0):
$U_M$=(au+cu)×c
$V_M$=(av+cv)×c
$C_M=\sqrt{((au+cu)^2+(av+cv)^2)}\times c$
$H_M$=arctan ((av+cv)/(au+cu))

Concerning the color cyan (R=0, G=1, B=1):
$U_C$=(bu+cu)×c
$V_C$=(bv+cv)×c
$C_C=\sqrt{((bu+cu)^2+(bv+cv)^2)}\times c$
$H_C$=arctan ((bv+cv)/(bu+cu))

Concerning the color yellow (R=1, G=0, B=0):
$U_Y$=(au+bu)×c
$V_Y$=(av+bv)×c
$C_Y=\sqrt{((au+bu)^2+(av+bv)^2)}\times c$
$H_Y$=arctan ((av+bv)/(au+bu))

Figure 10:
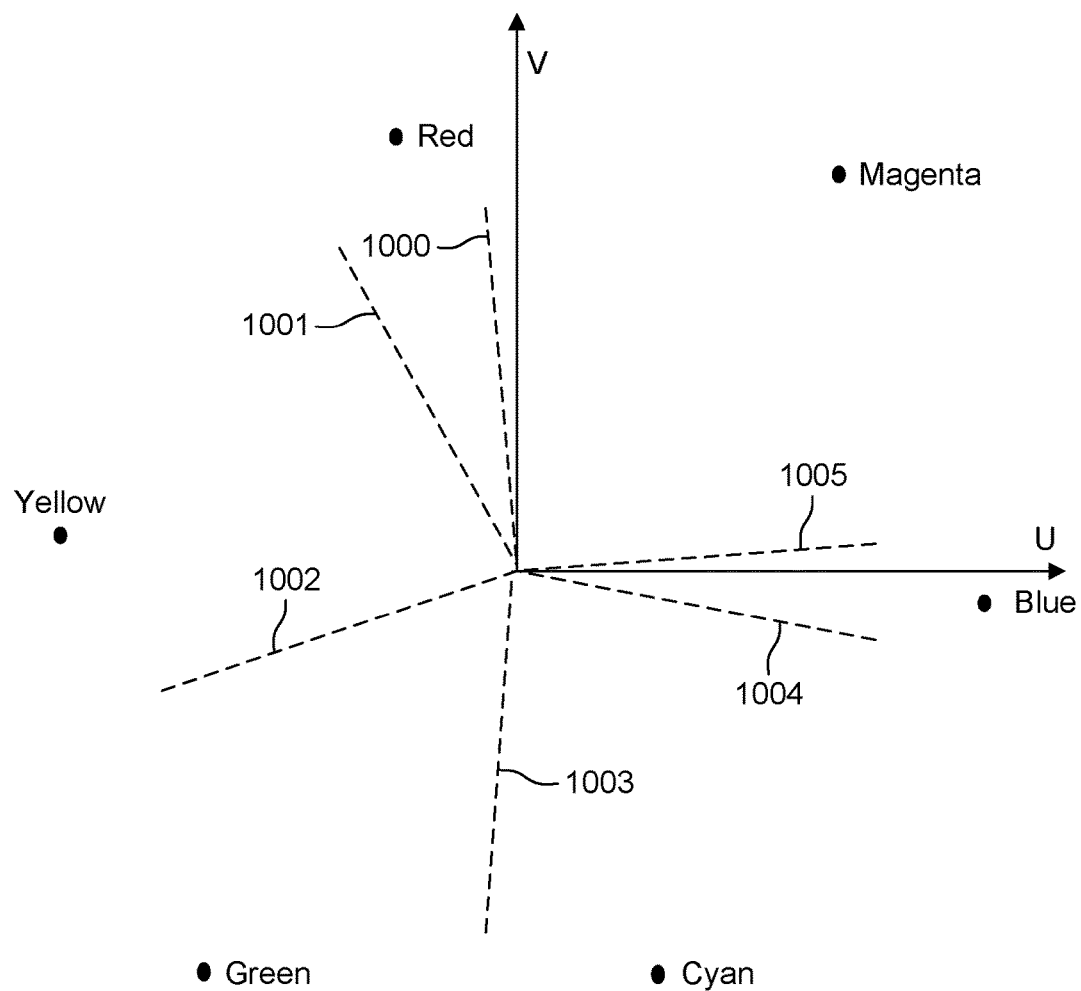
FIG. 10 represents positions of three primary (red, Green, blue) and secondary (Magenta, Yellow, Cyan) colors and corresponding sectors.

FIG. 10 represents positions of the three primary (red, Green, blue) and secondary (Magenta, Yellow, Cyan) colors as computed with the above formulas in an UV plane.

A given pixel represented by $U_{pre1}$ and $V_{pre1}$ belongs to one of the primary or secondary color line if its hue H value equals one of the hue values $H_G$, $H_R$, $H_B$, $H_M$, $H_C$, $H_Y$ computed above.

However, in an image, colors are rarely "pure" primary or secondary colors. Therefore, instead of defining six classes corresponding each to one of the primary or secondary colors, six sectors, each centered on one of the six primary and secondary colors, are defined. For each sector, a deviation angle delta is defined, and the corresponding sector is defined by four points:

Up=$C_{max}$*cos (H+delta)
Vp=$C_{max}$*sin (H+delta)
Um=$C_{max}$*cos (H−delta)
Vm=$C_{max}$*sin (H−delta)
where
$C_{max}=C_{Rmax}=\sqrt{(au^2+av^2)}$ and H=$H_R$ for red;
$C_{max}=C_{Gmax}=\sqrt{(bu^2+bv^2)}$ and H=$H_G$ for green;
$C_{max}=C_{Bmax}=\sqrt{(cu^2+cv^2)}$ and H=$H_B$ for blue;
$C_{max}=C_{Mmax}=\sqrt{((au+cu)^2+(av+cv)^2)}$ and H=$H_M$ for magenta;
$C_{max}=C_{Cmax}=\sqrt{((bu+cu)^2+(bv+cv)^2)}$ and H=$H_C$ for cyan;
$C_{max}=C_{Ymax}=\sqrt{((au+bu)^2+(av+bv)^2)}$ and H=$H_Y$ for yellow;

A way to check if a given pixel represented $U_{pre1}$ and $V_{pre1}$ belongs to a sector is to compute a product vector of a normalized value of said pixel with the two limits of the sector as follows:

$U_{curr}=U_{pre1}/1023$ $V_{curr}=V_{pre1}/1023$ $PV_p=U_{curr}\times V_p-V_{curr}\times U_p$ $PV_m=U_{curr}\times V_m-V_{curr}\times U_m$ If ($PV_p \geq 0$) and ($PV_m \leq 0$) then the pixel belongs to the sector.

In an embodiment, the value delta can be fixed and the same for the all sectors. In other embodiments, the value delta is different per sector.

In an embodiment, all sectors are contiguous, meaning that any pixel of the frame will belong to one of the sectors. In other embodiments, at least some sectors are not contiguous, meaning that some pixels could belong to none of the sectors.

FIG. 10 represents the six sectors corresponding to the three primary colors and the three secondary colors in the UV plan. The sectors are limited by the dashed lines 1000 to 1005. For example, the sector corresponding to the color red is limited by the dashed lines 1000 and 1001.

In a step 93, the processing module 40 generates a statistical representation of each sector (i.e. of each class). In an embodiment, the statistical representation comprises:
 an histogram histo representing a number of pixels found in the sector per each luma value, representative of $Y_{pre1}$ in the SL-HDR1 case
 a vector frame_chr_max[lum] representing, for each luma value lum of the histogram, a maximum chroma value of all pixels having the luma value lum in the sector;
 a value frame_chr_av[lum] representing, for each luma value lum of the histogram, an average chroma value of all pixels having the luma value lum in the sector.

One can note that the chroma value chr_curr of a current pixel is computed as follows:
 chr_cur=$\sqrt{(U_{curr}^2+v_{cur}^2)}$ where $U_{cur}$ and $V_{cur}$ are the U and V components of the current pixel.

In an embodiment, the bin number of the histograms and the entry number of the two vectors are set to "64". In another embodiment, the bin number and the entry number of the two vectors is set to "256", corresponding the sgf_x value range defined in the SL-HDRx standards for the Saturation Gain Function metadata. In another embodiment, the bin number of the histograms and the entry number of the two vectors can be lower than "64" or higher than "64".

In a step 94, the processing module 40 determines for each sector (i.e. for each color class) data representative of said sector. In an embodiment, the data representative of a sector is a dominant luminance value corresponding to the luminance at which the color in the current sector is predominant. The dominant luminance value of a sector is determined using at least one of the histogram histo corresponding to said sector, and the vectors frame_chr_max[lum] and frame_chr_av[lum] corresponding to said sector.

In a first embodiment of step 94, the dominant luminance value of a sector is determined by scanning the histogram histo of said sector and by determining the bin that has the (i.e. the luminance value corresponding to the) highest number of pixels.

Step 94 allows obtaining a vector frame_idx_max_histo comprising for each primary and secondary color (i.e. for each sector), a dominant chrominance value. For each sector, the chroma of the color will be eventually modified at that dominant luminance value, using a SGF function.

In a step 95, the processing module 40 determines a chroma gain (i.e. a scaling value or a color correction) to apply to chroma values for each color sector. To do so, the processing module 40 determines a maximum allowed chroma value for the color corresponding to the dominant luma value of each sector. This chroma gain is representative of a margin for increasing the chroma of that color and indirectly a maximum allowed chroma value for each sector and each luminance value.

As mentioned above, YUV values can be derived from RGB value using a matrix operation:

$$\begin{bmatrix} Y \\ U \\ V \end{bmatrix} = A \cdot \begin{bmatrix} R \\ G \\ B \end{bmatrix} = \begin{bmatrix} al & bl & cl \\ au & bu & cu \\ av & bv & cv \end{bmatrix} \cdot \begin{bmatrix} R \\ G \\ B \end{bmatrix}$$

For the 3 primary and the 3 secondary colors, when dealing with normalized RGB values (values in [0;1]) this leads to:
 Concerning the primary color red (component R), the processing module 40 computes the following values:
  R=s and G=B=0;
   Y=al×s and $Y_{Rmax}$=al (in the BT.2020 color gamut $Y_{Rmax}$=0.2627;
   U=au×s=au/al×Y;
   V=av×s=av/al×Y;
   C=$\sqrt{U^2+V^2}=\sqrt{(au/al\times Y)^2+(av/al\times Y)^2}$ and $C_{Rmax}=\sqrt{(au^2+(av)^2}$ (in the BT.2020 color gamut $C_{Rmax}$=0.519);
 Then the processing module 40 computes an envelop of allowed chroma values for the color red. In an embodiment, this envelop is made of two straight lines:
  An increasing straight line in the YC (Luma/chroma) space from a first point AR of coordinates (Y=0; C=0) to a second point BR of coordinates (Y=$Y_{Rmax}$; C=$C_{Rmax}$).
  A decreasing straight line in the YC (Luma/chroma) space from the second point to a third point CR of coordinates (Y=1; C=0).
 Concerning the primary color green (component G), the processing module 40 computes the following values:
  G=s and R=B=0;
   Y=bl×s and $Y_{Gmax}$=bl (in the BT.2020 color gamut $Y_{Gmax}$=0.678;

$U = bu \times s = bu/bl \times Y$;
$V = bv \times s = bv/bl \times Y$;
$C = \sqrt{U^2+V^2} = \sqrt{(bu/bl \times Y)^2 + (bv/bl \times Y)^2}$ and $C_{Rmax} = \sqrt{(bu^2+(bv)^2}$ (in the BT.2020 color gamut $C_{Gmax}=0.584$);

Then the processing module 40 computes an envelop of allowed chroma values for the color green. In an embodiment, this envelop is made of two straight lines:
An increasing straight line in the YC (Luma/chroma) space from a first point AG of coordinates (Y=0; C=0) to a second point BG of coordinates (Y=$Y_{Gmax}$; C=$C_{Gmax}$).
A decreasing straight line in the YC (Luma/chroma) space from the second point to a third point CG of coordinates (Y=1; C=0).
Concerning the primary color blue (component B), the processing module 40 computes the following values:
B=s and R=G=0;
$Y = cl \times s$ and $Y_{Bmax} = cl$ (in the BT.2020 color gamut $Y_{Bmax}=0.0593$;
$U = cu \times s = cu/cl \times Y$;
$V = cv \times s = cv/cl \times Y$;
$C = \sqrt{U^2+V^2} = \sqrt{(cu/cl \times Y)^2 + (cv/cl \times Y)^2}$ and $C_{Rmax} = \sqrt{(cu^2+(cv)^2}$ (in the BT.2020 color gamut $C_{Bmax}=0.502$);

Then the processing module 40 computes an envelop of allowed chroma values for the color blue. In an embodiment, this envelop is made of two straight lines:
An increasing straight line in the YC (Luma/chroma) space from a first point AB of coordinates (Y=0; C=0) to a second point BB of coordinates (Y=$Y_{Bmax}$; C=$C_{Bmax}$).
A decreasing straight line in the YC (Luma/chroma) space from the second point to a third point CB of coordinates (Y=1; C=0).
Concerning the secondary color magenta, the processing module 40 computes the following values:
R=B=s and G=0;
$Y = al \times s + cl \times C = (au+cu) \times R$ and $Y_{Mmax} = al+cl$ (in the BT.2020 color gamut $Y_{Mmax}=0.322$);
$U = au \times s + cu \times C = (au+cu) \times s$ and $U = (au+cu)/(al+cl) \times Y$;
$V = av \times s + cv \times C = (av+cv) \times s$ and $V = (av+cv)/(al+cl) \times Y$;
$C = \sqrt{U^2+V^2} = \sqrt{(au+cu)^2+(av+cv)^2}/(al+cl) \times Y$ and $C_{Mmax} = \sqrt{(au+cu)^2+(av+cv)^2}$ (in the BT.2020 color gamut $C_{Mmax}=0.584$);

Then the processing module 40 computes an envelop of allowed chroma values for the color magenta. In an embodiment, this envelop is made of two straight lines:
An increasing straight line in the YC (Luma/chroma) space from a first point AM of coordinates (Y=0; C=0) to a second point BM of coordinates (Y=$Y_{Mmax}$; C=$C_{Mmax}$).
A decreasing straight line in the YC (Luma/chroma) space from the second point to a third point CB of coordinates (Y=1; C=0).
Concerning the secondary color cyan, the processing module 40 computes the following values:
R=B=s and G=0;
$Y = bl \times s + cl \times C = (bl+cl) \times s$ and $Y_{Mmax} = bl+cl$ (in the BT.2020 color gamut $Y_{Cmax}=0.7373$);
$U = bu \times s + cu \times C = (bu+cu) \times s$ and $U = (bu+cu)/(bl+cl) \times Y$;
$V = bv \times s + cv \times C = (bv+cv) \times s$ and $V = (bv+cv)/(bl+cl) \times Y$;
$C = \sqrt{U^2+V^2} = \sqrt{(bu+cu)^2+(bv+cv)^2}/(bl+cl) \times Y$ and $C_{Mmax} = \sqrt{(bu+cu)^2+(bv+cv)^2}$ (in the BT.2020 color gamut $C_{Mmax}=0.519$);

Then the processing module 40 computes an envelop of allowed chroma values for the color cyan. In an embodiment, this envelop is made of two straight lines:
An increasing straight line in the YC (Luma/chroma) space from a first point AC of coordinates (Y=0; C=0) to a second point BC of coordinates (Y=$Y_{Cmax}$; C=$C_{Cmax}$).
A decreasing straight line in the YC (Luma/chroma) space from the second point to a third point CC of coordinates (Y=1; C=0).
Concerning the secondary color yellow, the processing module 40 computes the following values:
R=B=s and G=0;
$Y = al \times s + cl \times C = (al+bl) \times R$ and $Y_{Mmax} = al+bl$ (in the BT.2020 color gamut $Y_{Mmax}=0.9407$);
$U = au \times s + bu \times C = (au+bu) \times s$ and $U = (au+bu)/(al+bl) \times Y$;
$V = av \times s + cv \times C = (av+bv) \times s$ and $V = (av+bv)/(al+al) \times Y$;
$C = \sqrt{U^2+V^2} = \sqrt{(au+bu)^2+(av+bv)^2}/(al+bl) \times Y$ and $C_{Ymax} = \sqrt{(au+bu)^2+(av+bv)^2}$ (in the BT.2020 color gamut $C_{Ymax}=0.502$);

Then the processing module 40 computes an envelop of allowed chroma values for the color cyan. In an embodiment, this envelop is made of two straight lines:
An increasing straight line in the YC (Luma/chroma) space from a first point AY of coordinates (Y=0; C=0) to a second point BY of coordinates (Y=$Y_{Ymax}$; C=$C_{Ymax}$).
A decreasing straight line in the YC (Luma/chroma) space from the second point to a third point CY of coordinates (Y=1; C=0).

In an embodiment, the processing module 40 represents the six computed envelops by six vectors chr_envelop[S], one for each sector (i.e. one for each class), where S represents an index of the sector. For each sector S, the vector chr_envelop[S] comprises an information representative of a maximum allowed chroma value for each bin of the histogram histo[S].

In a sector, the vector chr_envelop[S] is used by the processing module 40 to determine a maximum allowed scaling value (i.e. a maximum allowed gain) scale_max[S] as follows:

cur_idx=frame_idx_max_histo[S];

scale_max[S]=chr_envelop[S][cur_idx]
frame_chr_max[S][cur_idx].

The maximum allowed scaling value scale_max[S] provide, in each sector S, a multiplication factor for the chroma at a selected luminance. The maximum allowed scaling value scale_max[S] allows obtaining an image with more chroma on colors that need to have more chroma and in a controlled and independent way.

In a step 96, the processing module encodes information representative of the chroma gain as metadata in a bitstream. The metadata are compliant with SL-HDR1. In an embodiment, the information representative of the chroma gain are the vector frame_idx_max_histo and a vector of the maximum allowed scaling values scale_max. This information are encoded in the form of a SGF function in the SL-HDR1 metadata.

In an embodiment where the number of bins in the histograms histo[S] is "256", frame_idx_max_histo range directly matches the sgf_x value range defined in the SL-HDRx standards for the Saturation Gain Function metadata and no adaptation is needed, i.e. value of frame_idx_max_histo can directly be copied in one of the sgf_x value of the SL-HDRx metadata. In an embodiment where the number of bins is different from "256", for instance "64", the processing module 40 rescales the vector frame_idx_max_histo to "256" prior to being encoded in sgf_x defining an SGF function.

The processing module 40 then assigns one of the six available sgf_x values to a bin number corresponding to an index cur_idx=frame_idx_max_histo[S] and uses the maximum allowed scaling values scale_max[S] to modify the corresponding default sgf_y value (normally equals to "118" in SL-HDR1 NCL case). In an embodiment with a number of bins equal to "256", six sectors, i.e. the three primary colors and the three secondary colors, the processing module 40 assigns one of the six available sgf_x values to a bin number corresponding to one of the index cur_idx=frame_idx_max_histo[S] and uses the maximum allowed scaling values scale_max[S] to modify the corresponding default sgf_y value:

For each sector S:

sgf_x[$S$]=frame_idx_max_histo[$S$] and
sgf_y[$S$]=scale_max[$S$].

Then the processing module 40 reorders the sgf_x and sgf_y values to ensure that sgf_x[i] values are monotonously increasing when i is increasing. The reordered sgf_x and sgf_y values allows defining an SGF function transmitted in the form of metadata to the post-processing module 14.

In an embodiment of step 91, the analyses is performed on a sub-sampled version of the current image.

In other embodiments of step 92, any other class representing a different hue or color or a different number of classes may be used.

In an embodiment of step 93, dark values (low luminance values) are not considered during the construction of the histogram since colors are difficult to distinguish for dark values. For example, luminance values lower than a first luminance threshold are not considered.

In an embodiment of step 93, bright values (high luminance values) are not considered during the construction of the histogram since colors are difficult to distinguish for bright values. For example, luminance values higher than a first luminance threshold are not considered.

In an embodiment of step 93, chroma values (chr_curr) below a chroma threshold are not taken into account in the construction of the histogram.

In a second embodiment of step 94, the processing module 40 computes for each histogram histo (i.e. for each sector) a value max_energy_chroma representative of a maximum chrominance energy in the sector. To do so, for each bin of each histogram histo, the processing module 40 computes a value energy_chroma[lum] representative of a chroma energy by multiplying the number of pixels at that bin histo[lum] by a maximum chroma value frame_chr_max[lum] found at that bin in the corresponding sector. Then, for each sector, the processing module determines the maximum chroma energy max_energy_chroma by determining the maximum of the energy_chroma[lum]. The dominant luma value is the luma value corresponding to the maximum chroma energy max_energy_chroma. One advantage of the second embodiment is to correlate the maximum chroma value with the luminance value (or the bin number) of the bin, giving a better idea of where are the most appealing areas in the image.

In a third embodiment of step 94, the processing module 40 computes for each histogram histo (i.e. for each sector) a value max_av_energy_chroma representative of a maximum average chroma energy in the sector. To do so, the processing module 40 replaces the maximum chroma value frame_chr_max[lum] by an average chroma value frame_chr_av[lum] in the process of the second embodiment. The dominant luma value is the luma value corresponding to the maximum average chroma energy max_av_energy_chroma.

In a variant of the first, second and third embodiments of step 94, only bins comprising at least a minimum number of pixels are taken into account during the scanning.

In a variant of the first, second and third embodiments of step 94, only bins corresponding to values of envelops of allowed chroma values higher than a minimum chroma value Chr_trigger are taken into account during the scanning. This embodiment avoids taking into account colors which are very little saturated. In a variant of the first, second and third embodiments of step 94, each histogram histo is pre-processed to smoother an eventual noise or remove too tiny peaks before searching the dominant luma values.

In an embodiment of step 95, the maximum allowed scaling value scale_max[S] can be limited to a maximum value absolute_scale_max[S], avoiding colors that are too much saturated. In an embodiment, the maximum value absolute_scale_max[S] is identical for all color sectors or different per sector. In that case, the maximum allowed scaling value scale_max[S] is computed as follows:

scale_max[$S$]=min(scale_max[$S$];
absolute_scale_max[$S$]).

In an embodiment of step 95, the maximum allowed scaling value scale_max[S] has a minimum value avoiding desaturated colors even if the analysis has shown that the envelop of allowed chroma values was lower than the current maximum chroma chr_max[S].

In an embodiment of step 95, when determining for a sector S the maximum allowed scaling value scale_max[S], the same computation can be done at the index cur_idx=frame_idx_max_histo[S] for the other color sectors. If at least one sector S' different from the current color sector S has a maximum allowed scaling value scale_max[S'] lower than the maximum allowed scaling value scale_max[S], the processing module 40 restricts the maximum allowed scaling value scale_max[S] to the lower maximum allowed scaling value scale_max[S'] found in another sector.

In an embodiment of step 95, instead of limiting the maximum allowed scaling value scale_max[S] of the current sector S to the minimum of the maximum allowed scaling values scale_max[S'] found in other sectors S' at the index cur_idx=frame_idx_max_histo[S], a further analysis of the maximum U and V values scaling that avoid clipping of the color sectors at the index cur_idx=frame_idx_max_histo[S] can be done. This analysis provides a value scale_max_UV that is used to limit scale_max[S] as follow:

scale_max[$S$]=min(scale_max[$S$], scale_max_UV);

If no temporal stabilization (i.e. temporal filtering) is applied, the vectors frame_idx_max_histo[S] and scale_max[S] risk to fluctuate. With these fluctuating vectors, the pre-processor 10 risks to generate an unstable and unacceptable sequence of SDR pictures.

In an optional step 97, the processing module applies a temporal stabilization method.

Figure 11:
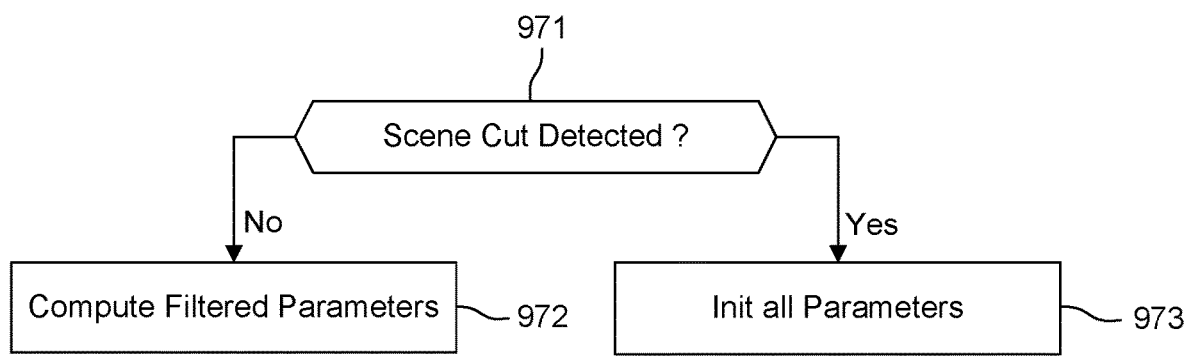
FIG. 11 illustrates schematically an example of a temporal stabilization method.

FIG. 11 details an example of embodiment of the optional step 97 of temporal stabilization.

In a step 971, the processing module 40 determines if the current image of the HDR content corresponds to a scene cut. To do so, for example, the processing module 40 compares the current image with the image preceding the current image in the HDR content. If, for example, a difference computed as a sum of absolute difference between the co-located pixels of the two images is above a threshold, the processing module 40 determines that the current image corresponds to a scene cut. In that case, step 971 is followed by a step 973. Otherwise, step 971 is followed by a step 972.

In the step 973, the processing module 40 initializes a set of parameters of the temporal stabilization method. In other words, the temporal stabilization is reinitialized during step 973.

In the step 972, the processing module 40 computes filtered vectors frame_idx_max_histo and scale_max.

In a embodiment, during step 971, instead of searching scene cuts, the processing module determines if the current image is the first image of the HDR content.

Figure 12:
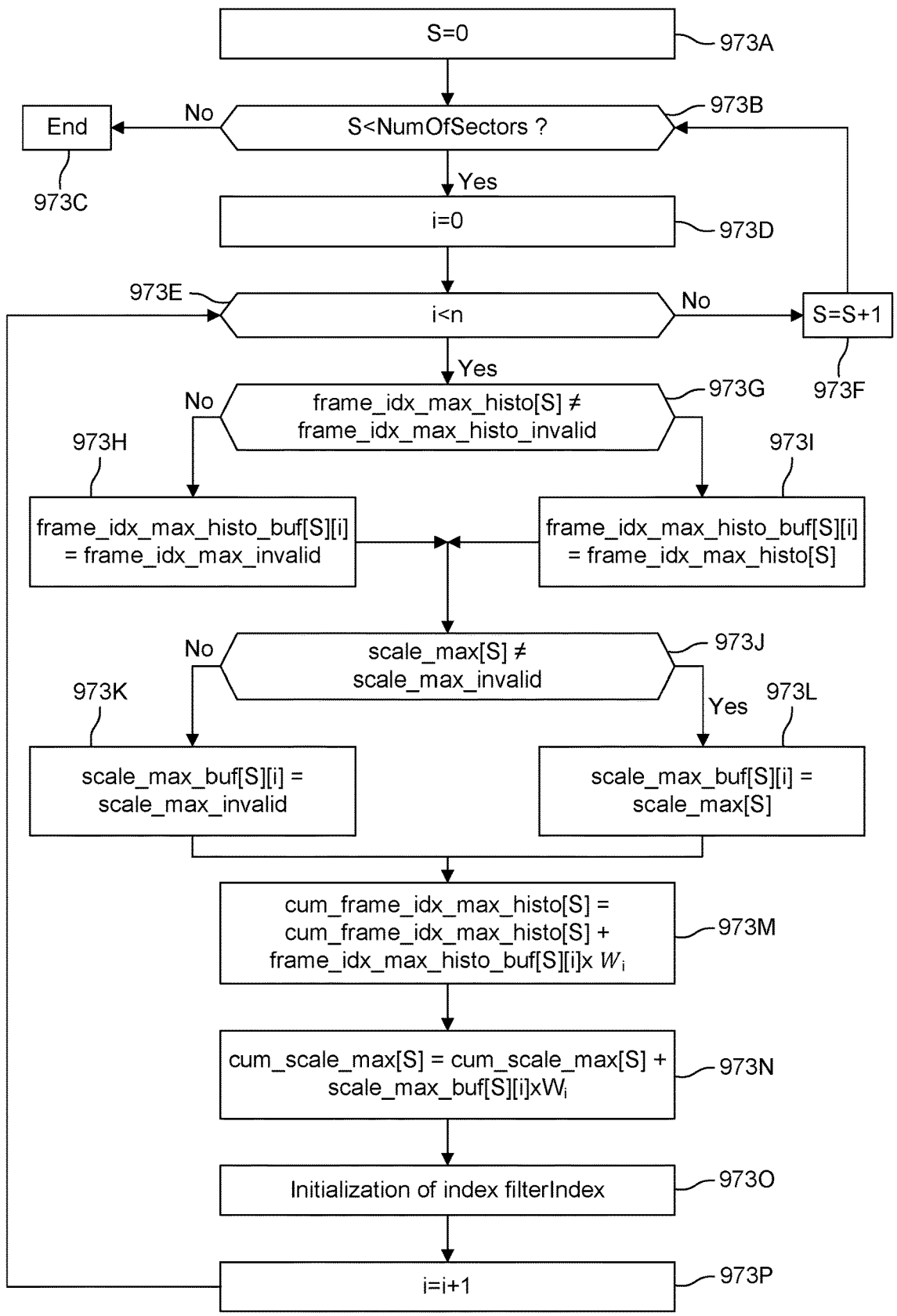
FIG. 12 illustrates schematically an example of an initialisation phase of the temporal stabilization method.

FIG. 12 details an example of embodiment of step 973.

In the example e of FIG. 12, a configurable circular buffer frame_idx_max_histo_buf[S] (respectively scale_max_buf[S]) is used for each parameter frame_idx_max_histo[S] (respectively scale_max[S]) for computing a filtered version of said parameter. In an embodiment, each buffer has a same size n representing a number of successive frames that are considered to compute the filtered version of the corresponding parameter. In an embodiment the buffer size n=10. An invalid value frame_idx_max_histo_invalid (respectively scale_max_invalid) is defined for each parameter frame_idx_max_histo[S] (respectively scale_max[S]). When this invalid value is generated by the method for determining a color correction of FIG. 9, this means that no valid histogram index and scale_max values have been computed for that current color sector of that current frame, i.e. there is no need to scale the chroma of the current color sector for the current frame. If, for example, "64" values are defined for the luma, frame_idx_max_histo[S] is between "0" and "63". Scale_max[S] can be also defined, for example, to be not higher than "5". If for the color red (S=red), the processing module 40 using the method for determining a color correction of FIG. 9 has determined that the red can be saturated, then frame_idx_max_histo[red] is in the range [0; 63] and scale_max[red] is in the range [0; 5]. However, if using the method of FIG. 9, the processing module 40 has determined that the color red must not be saturated, then an invalid value is assigned to frame_idx_max_histo[red] (for example "64") and to scale_max[red] (for example "10"). So, using the method of FIG. 9, the processing module 40 knows in function of the values of frame_idx_max_histo[red] and scale_max[red] if these values are valid and therefore need to be stabilized.

Consequently, when detecting an invalid value, there is no need temporally stabilize the current parameter. Each value of each buffer is initialized as described below.

As described above, in the process of FIG. 12, it is considered that all buffers have the same size n:

In a step 973A, the processing module 40 initializes a variable S representing a sector (i.e. representing a color) to zero.

In a step 973B, the processing module 40 determines if the variable S is lower than a number of sectors NumOfSectors. For example, NumOfSectors=6.

If S=NumOfSectors, the processing module 40 stops the initialization process 973.

Otherwise, the processing module 40 initialize a variable i to zero in a step 973D.

In a step 973E, the processing module 40 determines if i is below the buffer size n.

If i=n, the processing module 40 increments the variable S of one unit in a step 973F.

Otherwise, the processing module 40 determines if the parameter frame_idx_max_histo[S] is different from the invalid value frame_idx_max_histo_invalid. If frame_idx_max_histo[S]=frame_idx_max_histo_invalid, the processing module 40 sets the value of frame_idx_max_histo_buf[S][i] to frame_idx_max_invalid in a step 973H. Otherwise, the processing module 40 sets the value of frame_idx_max_histo_buf[S][i] to frame_idx_max_histo[S] in a step 973I.

Steps 973H and 973I are followed by a step 973J during which, the processing module 40 compares the parameter scale_max[S] to the invalid value scale_max_invalid. If scale_max[S]=scale_max_invalid, the processing module 40 sets the value scale_max_buf[S][i] to scale_max_invalid. Otherwise, the processing module 40 sets the value scale_max_buf[S][i] to scale_max[S] in a step 973L.

In a step 973M, the processing module 40 adds a value frame_idx_max_histo_buf[S][i]×$W_i$ to a value cum_frame_idx_max_histo[S]. The cumulated value cum_frame_idx_max_histo[S] is representative of all the values of the corresponding buffer. $W_i$ is a weighing factor. In an embodiment $W_i$=1. In another embodiment, $W_i$ is different for each value of i. In that last case, the cumulated value cum_frame_idx_max_histo[S] is a weighted sum of frame_idx_max_histo_buf[S][i] giving more weight to specific positions in the buffer.

In a step 973N, the processing module 40 adds a value scale_max_buf[S][i]×$W_i$ to a cumulated value cum_scale_max[S]. The cumulated value cum_scale_max[S] is representative of all the values of the corresponding buffer.

In a step 973O, the processing module 40 initializes an index filterIndex representative of a position of the current image in the buffer.

In an embodiment, when all buffers have the same size, filterIndex=0.

In another embodiment, each buffer associated to a parameter of the vectors frame_idx_max_histo and scale_max, has a different size. In that case, there is an index filterIndex for each buffer.

Figure 13:
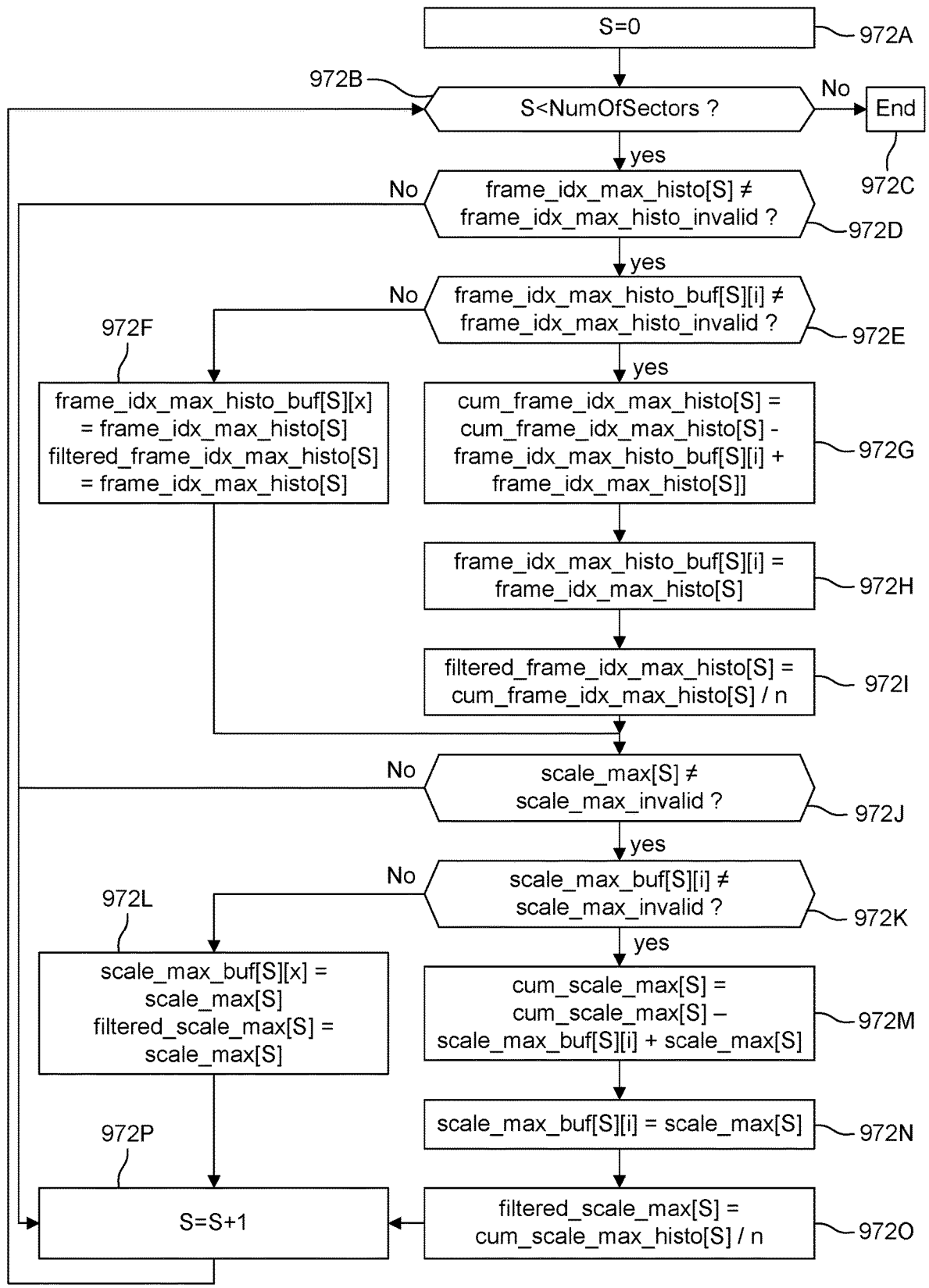
FIG. 13 illustrates schematically an example of an filtered parameters computation process of the temporal stabilization method.

FIG. 13 details an example of embodiment of step 972.

A purpose of the example of embodiment of step 972 is to filter the parameters of the vectors frame_idx_max_histo and scale_max. The process of FIG. 13 is executed by the processing module 40. These parameters are filtered has below:

For each parameter, the cumulative value is updated by:
  subtracting the oldest parameter value that corresponds to the one found at the current index. Subtracting can be a simple or a weighted subtraction of a combination between the oldest parameter value and any of the following one;
  adding the newest parameter value that has just been received. Addition can be a simple or a weighted addition of a combination between the newest parameter value and any of the preceding one.
update the buffer at the current index with the newest parameter that has just been received.
Compute the filtered value for each parameter. The filtered value can be:

a simple division of the corresponding cumulated value by the size of the corresponding buffer;

a division of the corresponding cumulated value by a number corresponding to a sum of the weighted additions of the combination between the newest parameter value and any of the preceding one that were taken into account when computing the cumulated value.

At this step, the processing module 40 checks if the buffer has already been initialized or not previously in the current cut. If yes, the processing module 40 updates the current buffer value if the current value is a valid value. If not, the processing module 40 initializes the buffers and the cumulated values as described in the step 973.

The example of embodiment of FIG. 13 applies when the buffer size n is the same for all parameters, the current index is i, the cumulated value is a simple sum for all parameters and the filtered value is a simple division by the buffer size n. In that case, all filtered values are computed as follow:

In a step 972A, the processing module 40 initializes a variable S representing a sector (i.e. representing a color).

In a step 972B, the processing module 40 determines if the variable S is lower than a number of sectors NumOfSectors.

If not, the processing module 40 stops the process of FIG. 13 in a step 972C.

Otherwise, the processing module 40 determines if the parameter frame_idx_max_histo[S] is different from frame_idx_max_histo_invalid. If frame_idx_max_histo[S]=frame_idx_max_histo_invalid step 972D is followed by a step 972P During step 972P, the processing module 40 reinitializes all buffer values frame_idx_max_histo_buf[S][x] (x from zero to the buffer size n) to frame_idx_max_histo_invalid. After this reinitialization, during step 972P, the processing module 40 increments the variable S of one unit. In addition, during step 972P, Step 972P is followed by step 972B.

If frame_idx_max_histo[S]≠frame_idx_max_histo_invalid step 972D is followed by step 972E. During step 972E, the processing module 40 determines if the value of the buffer frame_idx_max_histo_buf[S][i] differs from frame_idx_max_histo_invalid.

If frame_idx_max_histo_buf[S][i]=frame_idx_max_histo_invalid, step 972E is followed by a step 972F in which all buffer values frame_idx_max_histo_buf[S][x] (x from zero to the buffer size n) are initialized to frame_idx_max_histo[S]. In addition, during step 972F, the processing module 40 gives a value frame_idx_max_histo[S] to the filtered dominant chrominance value filtered_frame_idx_max_histo[S]

If frame_id_max_histo_buf[S][i]≠frame_idx_max_histo_invalid, step 972E, step 972E is followed by a step 972G during which the processing module 40 updates the cumulated value cum_frame_idx_max_histo[S] as follows:

cum_frame_idx_max_histo[$S$]=cum_frame_idx_max_histo[$S$]−frame_idx_max_histo_buf[$S$][$i$]+frame_idx_max_histo[$S$].

In a step 972H, the processing module 40 updates the buffer value frame_idx_max_histo_buf[S][i] as follows:

frame_idx_max_histo_buf[$S$][$i$]=frame_idx_max_histo[$S$].

In a step 972I, the processing module 40 obtains the filtered dominant chrominance value filtered_frame_idx_max_histo[S]:

filtered_frame_idx_max_histo[$S$]=cum_frame_idx_max_histo[$S$]/$n$.

Step 972I is followed by step 972J.

During step 972J, the processing module 40 determines if the maximum allowed scaling value scale_max[S] is different from the value scale_max_invalid.

If scale_max[S]=scale_max_invalid, the processing module 40 reinitializes all buffer values scale_max_buf[S][x] to scale_max_invalid. After this reinitialization, the processing module 40 increments the variable S of one unit during step 972P.

Otherwise, the processing module 40 determines during a step 972K if the buffer value scale_max_buf[S][i] differs from the value scale_max_invalid. If scale_max_buf[S][i]=scale_max_invalid, in a step 972L, the processing module sets the buffer values scale_max_buf[S][x] to scale_max[S] and the filtered maximum allowed scaling value filtered_scale_max[S] to the value scale_max[S]. Step 972L is followed by step 972P.

Otherwise, in a step 972M, the processing module updates the cumulated value cum_scale_max[S] as follows:

cum_scale_max[$S$]=cum_scale_max[$S$]−scale_max_buf[$S$][$i$]+scale_max[$S$].

In a step 972N, the processing module 40 updates the buffer value scale_max_buf[S][i] as follows:

scale_max_buf[$S$][$i$]=scale_max[$S$].

In a step 972O, the processing module 40 obtains the filtered maximum allowed scaling value as follows:

filtered_scale_max[$S$]=cum_scale_max_histo[$S$]/$n$.

Step 972O is followed by step 972P.

Then for each sector S the filtered values replace the non-filtered values in the definition of the SGF function transmitted in the form of metadata to the post-processing module:

sgf_x[$S$]=filtered_frame_idx_max_histo[$S$] and sgf_y[$S$]=filtered_scale_max[$S$].

It should be noted that, in case of SL-HDR1, all the processing that aims at determining the SGF function are based on the $Y_{pre0}$, $U_{pre1}$ and $V_{pre1}$ intermediate signals that are representative of the output of the SL-HDR1 pre-processing module, i.e. a SDR signal. In other words, all the computations have been done in the SDR domain.

FIG. 14 describes schematically an embodiment of the method to control a color correction adapted to a SL-HDR2 system.

The method to control a color correction described in relation of FIG. 9 addresses a SL-HDR1 system. In SL-HDR2 pre-processor, there is no SDR signal generation. In a step 140 of the embodiment adapted to SL-HDR2 systems of FIG. 14, the analysis of the chroma of the current image is made in the SL-HDR2 pre-processor (i.e. is made by the processing module 40) by emulating the SL-HDR2 post-processor from step 801 to step 807 of the reconstruction process described in relation to FIG. 8 until obtaining the variables $HDR_R$, $HDR_G$ and $HDR_B$, $U_{post2}$, $V_{post2}$. The reconstruction process is done by considering that the connected display is a SDR display. Therefore, the reconstructed process generates $HDR_R$, $HDR_G$ and $HDR_B$ signals that are in fact SDR signals.

A SL-HDR2 post-processing module (more precisely a reconstruction module) ingests a HDR signal and generates a SDR or a MDR or a HDR signal. The method described in relation to FIG. 9 allows determining SGF points coordinates sgf_x and sgf_y in the SDR domain. However, in a real SL-HDR2 post-processor, these points are applied on an input HDR signal. Therefore, in the SL-HDR2 case, all computed SGF points are mapped in the HDR domain which implies an estimation of an SDR to HDR transform.

In a step 141, the processing module computes a SDR to HDR transform. This is done in two steps by using two values Lhisto_cur_sdr and Lhisto_cur_hdr, and three vectors: Lhisto_match_sdr_hdr_min, Lhisto_match_sdr_hdr_max and Lhisto_match_sdr_hdr. In a first step, for each pixel of a current image of the HDR content, Lhisto_match_sdr_hdr_min and Lhisto_match_sdr_hdr_max are computed as follow:

$$Y_{post2} = A_1 \begin{bmatrix} HDR_R^{\frac{1}{\gamma}} \\ HDR_G^{\frac{1}{\gamma}} \\ HDR_B^{\frac{1}{\gamma}} \end{bmatrix},$$

with $HDR_R$, $HDR_G$ and $HDR_B$ being in the SDR domain, and $\gamma$ is the "2.4" gamma factor.

Lhisto_cur_sdr=CLAMP(($Y_{post2}$/16+0.5), 0, NumBins−1)

Lhisto_cur_hdr=CLAMP(($Y_{post1}$/16+0.5), 0, NumBins−1)

Where CLAMP(x,y,z) takes the min(max(x,y), z) and NumBins is a number of bins in the histogram (for example, NumBins=64).

Lhisto_match_sdr_hdr_min[Lhisto_cur]=min(Lhisto_match_sdr_hdr_min[Lhi sto_cur_sdr], Lhisto_cur_hdr);

Lhisto_match_sdr_hdr_max[Lhisto_cur]=max(Lhisto_match_sdr_hdr_max[L histo_cur_sdr], Lhisto_cur_hdr);

In a second step, after all pixels have been analyzed, the estimated SDR to HDR transforms is computed as represented in FIG. 15.

In a step 1410, the processing module 40 initialize a variable Last_correct_value to zero.

In a step 1411, the processing module 40 initialize a variable lum to zero.

In a step 1412, the processing module 40 determines if the variable lum is below NumBins If lum=NumBins, the processing module stops the process of FIG. 15. Otherwise, in a step 1404, the processing module 40 computes a value Lhist_match_sdr_hdr[lum] as follows:

Lhisto_match_sdr_hdr[lum]=Lhisto_match_sdr_hdr_min[lum]+Lhisto_match_sdr_hdr_max [lum])/2.

In a step 1415, the processing module 40 determines if the value Lhisto_match_sdr_hdr[lum] is equal to NumBins.

If yes, the processing module 40 computes in a step 1417 the value Lhisto_match_sdr_hdr [lum] as follows:

Lhisto_match_sdr_hdr[lum]=last_correct_value.

Otherwise, in a step 1416, the processing module computes the value last_correct_value as follows:

last_correct_value=Lhisto_match_sdr_hdr[lum].

Steps 1416 and 1417 are followed by a step 1418 during which the value lum is incremented by one unit.

In a step 142, the processing module 40 applies steps 90 to 96 to determine the vectors frame_idx_max_histo and scale_max.

In a step 143, the processing module 40 maps the parameters of the vector frame_idx_max_histo to the HDR domain as represented in FIG. 16.

In a step 1430, the processing module 40 initialize a variable S to zero.

In a step 1431, the processing module 40 determines if the variable S is lower than NumOfSectors.

If S=NumOfSectors, the processing module 40 stops the process of FIG. 16 in a step 1432.

Otherwise, the processing module determines if the parameter frame_idx_max_histo[S] is lower than NumBins.

If frame_idx_max_histo[S]=NumBins, the processing module 40 increments the variable S of one unit in a step 1436. Step 1436 is followed by step 1431.

Otherwise, in a step 1434, the processing module 40 computes the variable Lhisto_sdr as follows:

Lhisto_sdr=frame_idx_max_histo[S].

In a step 1435, the processing module 40 computes the parameter frame_idx_max_histo[S] as follows:

frame_idx_max_histo[S]=Lhisto_match_sdr_hdr [Lhisto_sdr].

Step 1435 is followed by step 1436.

Back to FIG. 14, after step 143, the processing module 40 executes a step 144 during which the processing module 40 computes the SGF points representative of the SGF function. For each sector S:

sgf_x[S]=frame_idx_max_histo[S] and sgf_y_tmp[S]=scale_max[S].

Then the processing module 40 reorders the sgf_x and sgf_y_tmp values to ensure that sgf_x[i] values are monotonously increasing when i is increasing. The reordered sgf_x and sgf_y_tmp values allows defining an SGF function transmitted in the form of metadata to the post-processing module 14.

In step 142, all the computations are done to generate a SGF function that improves the saturation in the SL-HDR1 case, with steps 90 to 96. Finally, as the SGF function works differently between SL-HDR1 and SL-HDR2, all sgf_y_tmp (Y) values that have been computed in step 96 in the case of SL-HDR1 need to be adapted to the SL-HDR2 case.

In SL-HDR1, the SGF is applied at the pre-processor side, in step 605 of FIG. 6, with $$\beta_0(Y) = lutCC[Y] \cdot (invLUT[Y_{post2}])^{\frac{1}{\gamma}} = lutCC[Y] \cdot f(Y)$$

With $$lutCC[Y] = f\left(\frac{L(Y)}{f_{sgf}(Y)}\right),$$

where the saturation gain function $f_{sgf}(Y_n)$ is derived from the piece-wise linear pivot points defined by the Saturation Gain Function metadata sgf_x and sgf_y, as detailed in clause 7.3 of the document ETSI TS 103 433-1 v1.3.1.

At a given luminance Y, when increasing sgf(Y) by an increment value incr:

$$lutCC\_incr[Y] = lutCC[Y] \cdot \frac{128}{128 + incr}$$

Therefore, when increasing sgf(Y) by incr, $U_{pre1}$ (respectively $V_{pre1}$) are modified as:

$$U_{pre1\_incr}[Y] = U_{pre1}[Y] \cdot \frac{128 + incr}{128}$$

$$V_{pre1\_incr}[Y] = V_{pre1}[Y] \cdot \frac{128 + incr}{128}$$

Any positive value of incr will increase $U_{pre1}$ (resp. $V_{pre1}$) and therefore will increase the saturation of the pixel.

In SL-HDR2, the SGF is applied at the post-processor side, in step 804 of FIG. 8, with lutCC[Y]. When increasing sgf(Y) by incr, $U_{post2}$ (respectively $V_{post2}$) are modified as:

$$U_{post2\_incr}[Y] = U_{post2}[Y] \cdot \frac{128}{128 + incr}$$

$$V_{post2\_incr}[Y] = V_{post2}[Y] \cdot \frac{128}{128 + incr}$$

Any positive value of incr will decrease $U_{post2}$ (respectively $V_{post2}$) and therefore will decrease the saturation of the corresponding pixel.

Therefore, in SL-HDR2 the increment incr_slhdr2 is computed in function of a corresponding SL-HDR1 increment incr_sihdr1, so that:

$$\frac{128 + incr\_slhdr1}{128} = \frac{128}{128 + incr\_slhdr2}$$

Finally, this leads to compute the final SL-HDR2 sgf_y value:

$$sgf\_y(i) = \frac{128 * 128}{128 + sgf\_y\_tmp(i)}$$

The invention claimed is:

1. A method comprising:
   obtaining a current multi-components image;
   obtaining a chrominance plane representative of a color gamut and dividing the chrominance plane in a plurality of chrominance sectors;
   using tone mapped luma component and corrected normalized chrominance components derived from the current multi-components image to classify colors of pixels of the current multi-components image in the plurality of chrominance sectors;
   for each chrominance sector, determining data representative of said chrominance sector, comprising a dominant luminance value representative of a luminance at which a color in said chrominance sector is predominant and determining from said data representative of said chrominance sector a value representative of a gain of chrominance representative of a maximum allowed chroma value for a chrominance component in said chrominance sector; and
   encoding the dominant luminance value and the value representative of the gain corresponding to each chrominance sector as metadata representative of a Saturation Gain Function in a bitstream, said function defining a color correction to apply to a pixel of the current multi-components image in function of a luminance of said pixel.

2. The method of claim 1, wherein the tone mapped luma component and the corrected normalized chrominance components of pixels of the current multi-components image are obtained by analyzing chrominance components of the current multi-components image, the analysis comprising for each pixel of at least a subset of pixels of the current multi-components image:
   deriving a luma component from the components of said pixel;
   applying a tone mapping to the derived luma component to obtain a tone mapped luma component;
   deriving chrominance components from the components of said pixel; and
   applying a joint normalization and color correction to the chrominance components to obtain corrected normalized chrominance components.

3. The method of claim 1, wherein the current multi-components image is comprised in a video sequence and a temporal filtering is applied to the information representative of the chroma gain based on information representative of chroma gains computed for images of the video sequence preceding the current multi-components image.

4. The method of claim 3, wherein the temporal filtering is reinitialized at a beginning of the video sequence or when a scene cut is identified in the video sequence.

5. The method of claim 1, wherein the chrominance sectors are chrominance sectors around a pure primary and/or secondary color in the chrominance plane.

6. The method of claim 5, wherein a combination of the chrominance sectors covers integrally the chrominance plane.

7. The method of claim 1, wherein determining data representative of said chrominance sector comprises obtaining a histogram of luminance values of pixels of the current multi-components image in function of luminance values for the said chrominance sector.

8. The method of claim 7, wherein only pixels corresponding to luminance values comprised in a predefined range of luminance values are used for obtaining the histogram.

9. The method of claim 7, wherein the dominant luminance value corresponds to a luminance value for which there is a maximum of pixels in the histogram or a luminance value for which there is a maximum chrominance energy, a chrominance energy being computed for a bin of the histogram by multiplying a number of pixels corresponding to that bin by a maximum chroma value found at that bin or a luminance value for which there is a maximum average chrominance energy, an average chrominance energy being computed for a bin of the histogram by multiplying a number of pixels corresponding to that bin by a maximum chroma value found at that bin.

10. A device comprising electronic circuitry configured for:
   obtaining a current multi-components image;
   obtaining a chrominance plane representative of a color gamut and dividing the chrominance plane in a plurality of chrominance sectors;
   using tone mapped luma component and corrected normalized chrominance components derived from the current multi-components image to classify colors of pixels of the current multi-components image in the plurality of chrominance sectors;

determining, for each chrominance sector, data representative of said chrominance sector, comprising a dominant luminance value representative of a luminance at which a color in said chrominance sector is predominant and determining from said data representative of said chrominance sector a value representative of a gain of chrominance representative of a maximum allowed chroma value for a chrominance component in said chrominance sector; and encoding the dominant luminance value and the value representative of the gain corresponding to each chrominance sector as metadata representative of a Saturation Gain Function in a bitstream, said function defining a color correction to apply to a pixel of the current multi-components image in function of a luminance of said pixel.

11. The device of claim 10, wherein the electronic circuitry is further configured for analyzing the chrominance components of the current multi-components image applied for each pixel of at least a subset of pixels of the current multi-components image to obtain the tone mapped luma component and the corrected normalized chrominance components of pixels of the current multi-components image, the analyzing comprising:

deriving a luma component from the components of said pixel;

applying a tone mapping to the derived luma component to obtain a tone mapped luma component;

deriving chrominance components from the components of said pixel; and applying a joint normalization and color correction to the chrominance components to obtain corrected normalized chrominance components.

12. The device of claim 10, wherein the current multi-components image is comprised in a video sequence and the electronic circuitry is further configured for applying a temporal filtering to the information representative of the chroma gain based on information representative of chroma gains computed for images of the video sequence preceding the current multi-components image.

13. The device of claim 12, wherein the temporal filtering is reinitialized at a beginning of the video sequence or when a scene cut is identified in the video sequence.

14. The device of claim 10, wherein the chrominance sectors are chrominance sectors around a pure primary and/or secondary color in the chrominance plane.

15. The device of claim 14, wherein a combination of the chrominance sectors covers integrally the chrominance plane.

16. The device of claim 10, wherein determining data representative of said chrominance sector comprises obtaining a histogram of luminance values of pixels of the current multi-components image in function of luminance values for the said chrominance sector.

17. The device of claim 16, wherein only pixels corresponding to luminance values comprised in a predefined range of luminance values are used for obtaining the histogram.

18. The device of claim 16, wherein the dominant luminance value corresponds to a luminance value for which there is a maximum of pixels in the histogram or a luminance value for which there is a maximum chrominance energy, a chrominance energy being computed for a bin of the histogram by multiplying a number of pixels corresponding to that bin by a maximum chroma value found at that bin or a luminance value for which there is a maximum average chrominance energy, an average chrominance energy being computed for a bin of the histogram by multiplying a number of pixels corresponding to that bin by a maximum chroma value found at that bin.

19. A non-transitory information storage medium storing program code instructions for implementing the method of claim 1.

* * * * *